United States Patent
Butler et al.

(10) Patent No.: US 10,180,544 B2
(45) Date of Patent: Jan. 15, 2019

(54) MICRO-OPTICAL SYSTEMS AND ASSEMBLIES USING GLASS TUBES AND METHODS OF FORMING SAME

(71) Applicant: Corning Optical Communications LLC, Hickory, NC (US)

(72) Inventors: Douglas Llewellyn Butler, Painted Post, NY (US); Alan Frank Evans, Beaver Dams, NY (US); Dong Gui, San Jose, CA (US); Zilong Jiang, San Jose, CA (US); Yao Li, Newark, CA (US); James Scott Sutherland, Corning, NY (US)

(73) Assignee: Corning Optical Communications LLC, Hickory, NC (US)

( * ) Notice: Subject to any disclaimer, the term of this patent is extended or adjusted under 35 U.S.C. 154(b) by 11 days.

(21) Appl. No.: 15/422,705

(22) Filed: Feb. 2, 2017

(65) Prior Publication Data

US 2018/0136418 A1 May 17, 2018

Related U.S. Application Data

(60) Provisional application No. 62/423,364, filed on Nov. 17, 2016.

(51) Int. Cl.
*G02B 6/42* (2006.01)
*G02B 6/32* (2006.01)
(Continued)

(52) U.S. Cl.
CPC .......... *G02B 6/4206* (2013.01); *B23K 1/0008* (2013.01); *B23K 1/19* (2013.01);
(Continued)

(58) Field of Classification Search
CPC .... G02B 6/4206; G02B 6/2938; G02B 6/325; G02B 6/423; G02B 6/4256; G02B 6/4285; G02B 3/0087; B03B 37/0256; B03B 37/15
See application file for complete search history.

(56) References Cited

U.S. PATENT DOCUMENTS 4,252,457 A * 2/1981 Benson ................ G02B 6/4202
403/179
4,589,725 A * 5/1986 Dyott ..................... G02B 6/105
385/141

(Continued)

FOREIGN PATENT DOCUMENTS

| CN | 101259950 A | 9/2008 |
| JP | 2004046105 A | 2/2004 |

OTHER PUBLICATIONS

Grzybowski et al., "Extraordinary laser-induced swelling of oxide glasses," Optics Express vol. 17, No. 7, pp. 5058-5068, © 2009 OSA.

*Primary Examiner* — Peter Radkowski
(74) *Attorney, Agent, or Firm* — Robert L. Branham

(57) ABSTRACT

The micro-optical systems disclosed herein employ a glass tube having a body, a front end, a back end, an outer surface, and a bore that runs through the body between the front and back ends and that has a bore axis. The outer surface has a maximum outer dimension between 0.1 mm and 20 mm and includes at least one flat side. At least one optical element is inserted into and operably disposed and secured within the bore. The micro-optical assemblies are formed by securing one or more micro-optical systems to a substrate at the flat side of the glass tube. The glass tube is formed by a drawing process that allows for the dimensions of the glass tube to be small and formed with relatively high precision. An example (Continued)

of a compact WDM micro-optical assembly that employs micro-collimators is disclosed.

20 Claims, 17 Drawing Sheets

(51) Int. Cl.
*G02B 3/00* (2006.01)
*G02B 6/293* (2006.01)
*C03C 27/10* (2006.01)
*C03B 23/047* (2006.01)
*C03B 23/20* (2006.01)
*B23K 1/00* (2006.01)
*B23K 1/19* (2006.01)
*B23K 26/22* (2006.01)
*B23K 26/324* (2014.01)
*B23K 26/244* (2014.01)
*B23K 101/20* (2006.01)
*B23K 103/00* (2006.01)

(52) U.S. Cl.
CPC ............ *B23K 26/22* (2013.01); *B23K 26/244* (2015.10); *B23K 26/324* (2013.01); *C03B 23/047* (2013.01); *C03B 23/20* (2013.01); *C03C 27/10* (2013.01); *G02B 3/0087* (2013.01); *G02B 6/2938* (2013.01); *G02B 6/325* (2013.01); *G02B 6/423* (2013.01); *G02B 6/4256* (2013.01); *G02B 6/4285* (2013.01); *B23K 2201/20* (2013.01); *B23K 2203/54* (2015.10)

(56) References Cited

U.S. PATENT DOCUMENTS

| | | | | |
|---|---|---|---|---|
| 4,669,814 A * | 6/1987 | Dyott | ............... | C03B 37/027 359/900 |
| 5,251,276 A * | 10/1993 | Berkey | ............... | G02B 6/2835 385/43 |
| 5,418,870 A * | 5/1995 | Keck | ............... | G02B 6/262 257/E31.109 |
| 6,168,319 B1 * | 1/2001 | Francis | ............... | G02B 6/2937 385/55 |
| 6,185,347 B1 * | 2/2001 | Zheng | ............... | G02B 6/2937 385/16 |
| 6,263,133 B1 | 7/2001 | Hamm | | |
| 6,322,256 B1 * | 11/2001 | Inada | ............... | G02B 6/255 385/59 |
| 6,582,135 B2 * | 6/2003 | Brun | ............... | G02B 6/2937 385/34 |
| 6,643,446 B2 * | 11/2003 | Moidu | ............... | G02B 6/4248 385/138 |
| 6,729,770 B2 * | 5/2004 | Brun | ............... | G02B 6/2937 385/60 |
| 6,746,160 B2 | 6/2004 | Takeuti et al. | | |
| 6,760,516 B2 * | 7/2004 | Brun | ............... | G02B 6/29364 385/31 |
| 6,764,224 B2 * | 7/2004 | Brun | ............... | G02B 6/2937 385/60 |
| 6,767,139 B2 * | 7/2004 | Brun | ............... | G02B 6/29364 385/33 |
| 6,782,146 B2 * | 8/2004 | Hellman | ............... | G02B 6/2706 385/11 |
| 6,854,900 B2 | 2/2005 | Lai et al. | | |
| 6,960,026 B2 * | 11/2005 | Brun | ............... | G02B 6/2937 385/78 |
| 6,961,496 B2 * | 11/2005 | Hellman | ............... | G02B 6/2937 385/33 |
| 7,068,883 B2 * | 6/2006 | Ludington | ............... | G02B 6/2937 385/33 |
| 7,187,826 B2 * | 3/2007 | Brun | ............... | G02B 6/29364 385/140 |
| 7,480,432 B2 | 1/2009 | Gzrybowski et al. | | |
| 7,621,673 B2 * | 11/2009 | Takeuchi | ............... | G02B 6/3636 385/60 |
| 7,724,992 B2 | 5/2010 | Sutherland | | |
| 7,792,404 B2 | 9/2010 | Streltsov et al. | | |
| 7,917,036 B2 * | 3/2011 | Ori | ............... | G02B 6/4246 398/136 |
| 8,291,729 B2 | 10/2012 | Gzrybowski et al. | | |
| 8,397,537 B2 | 3/2013 | Gzrybowski et al. | | |
| 8,840,318 B2 * | 9/2014 | Baca | ............... | G02B 6/3854 385/62 |
| 8,998,507 B2 * | 4/2015 | Fortusini | ............... | G02B 6/3833 385/88 |
| 2002/0064329 A1 * | 5/2002 | Sobiski | ............... | G02B 6/105 385/11 |
| 2002/0081066 A1 * | 6/2002 | Brun | ............... | G02B 6/2937 385/34 |
| 2002/0081067 A1 * | 6/2002 | Brun | ............... | G02B 6/29364 385/34 |
| 2002/0094172 A1 * | 7/2002 | Brun | ............... | G02B 6/2937 385/78 |
| 2002/0106155 A1 * | 8/2002 | Brun | ............... | G02B 6/2937 385/34 |
| 2002/0110322 A1 * | 8/2002 | Brun | ............... | G02B 6/29364 385/33 |
| 2002/0118929 A1 * | 8/2002 | Brun | ............... | G02B 6/2937 385/84 |
| 2003/0063832 A1 * | 4/2003 | Hellman | ............... | G02B 6/2706 385/11 |
| 2003/0099453 A1 * | 5/2003 | Moidu | ............... | G02B 6/4248 385/138 |
| 2003/0185513 A1 * | 10/2003 | Hellman | ............... | G02B 6/2937 385/47 |
| 2003/0190135 A1 * | 10/2003 | Moidu | ............... | G02B 6/4248 385/138 |
| 2004/0062478 A1 * | 4/2004 | Ludington | ............... | G02B 6/2937 385/33 |
| 2004/0234204 A1 * | 11/2004 | Brun | ............... | G02B 6/29364 385/39 |
| 2007/0183735 A1 * | 8/2007 | Takeuchi | ............... | G02B 6/3636 385/137 |
| 2010/0150501 A1 * | 6/2010 | Cox | ............... | G02B 6/125 385/48 |
| 2010/0154877 A1 | 6/2010 | Bhagavatula et al. | | |
| 2011/0170112 A1 * | 7/2011 | Gibler | ............... | G01J 3/02 356/480 |
| 2011/0194821 A1 * | 8/2011 | Fortusini | ............... | G02B 6/3833 385/88 |
| 2012/0189252 A1 * | 7/2012 | Bhagavatula | ............... | G02B 6/32 385/79 |
| 2014/0029899 A1 * | 1/2014 | Isenhour | ............... | G02B 6/3829 385/79 |
| 2014/0105545 A1 * | 4/2014 | Danley | ............... | G02B 6/3854 385/78 |
| 2014/0105547 A1 * | 4/2014 | Baca | ............... | G02B 6/3854 385/78 |
| 2014/0199027 A1 * | 7/2014 | Miller | ............... | G02B 6/3854 385/72 |

* cited by examiner

MICRO-OPTICAL SYSTEMS AND ASSEMBLIES USING GLASS TUBES AND METHODS OF FORMING SAME

PRIORITY APPLICATION

This application claims the benefit of priority to U.S. Provisional Patent Application Ser. No. 62/423,364 filed on Nov. 17, 2016, the content of which is relied upon and incorporated herein by reference in its entirety.

FIELD

The present disclosure relates generally to optical systems, and particularly relates to micro-optical systems, and more particularly relates to micro-optical systems and assemblies using glass tubes, as well as to methods of forming the micro-optical systems, the assemblies and the glass tubes.

BACKGROUND

Micro-optical systems employ optical elements that typically range in size from a few microns to a few millimeters and are used in a variety of optical and optical-electrical technologies and applications that require a small foot print or small form factor. With the increasing miniaturization of many types of optical and optical-electrical devices and systems, increasing demands are being placed on the size, performance, and integration requirements of micro-optical systems.

An example application where micro-optical systems are seeing increased use and increasing demands on size, performance, and integration is optical telecommunications. As high-speed optical telecommunications and data communications evolve, multiple wavelength channels are becoming widely adopted even in short-distance data center applications. As a result, multiplexer/de-multiplexer (Mux/DeMux) devices that employ micro-collimators and optical wavelength filters are becoming an important component in optical modules, such as C-form factor pluggable (CFP) optical modules, to functionally combine/split multiple optical signals each operating at a designated wavelength into/from a common input/output (I/O) optical fiber.

The ever-increasing demands for greater bandwidth is driving the telecommunications industry toward greater number of wavelength channels. Adding to this trend, the dimensions of the optical transceivers are decreasing dramatically, requiring increasingly smaller micro-optical beam collimators and pitches between adjacent channels to keep the size of the WDM device as small as possible. Further, increasing demands for greater device reliability calls for the use of fabrication techniques that keep the optical components in the WDM device in relative alignment. In addition, the micro-optical beam collimators occupy significant space in WDM and largely define the device form factor while also playing a key role in device reliability and optical performance.

SUMMARY

An aspect of the disclosure is a micro-optical system that includes a glass tube. The glass tube has a body, a front end, a back end, an outer surface, and a bore that runs through the body between the front end and the back end. The outer surface has a maximum outer dimension in the range from 0.1 mm to 20 mm or 0.1 to 10 mm and includes at least one flat side. The micro-optical system also includes at least one optical element in the bore. The at least one optical element is sized to be movable within the bore to a select location within the bore. At least one of a securing feature is used to secure the at least one optical element at the select location.

Another aspect of the disclosure is a micro-optical assembly that includes at least one micro-optical system as described above, secured to the upper surface of the substrate at the at least one flat side of the glass tube. An example micro-optical assembly is a WDM micro-optical assembly that includes first, second and third micro-optical systems each configured as a micro-collimator, and further includes: the first and second micro-collimators arranged facing each other along a first axis with an optical wavelength filter in between and the third micro-collimator being disposed along a second axis defined by the optical wavelength filter and that makes an angle with the first axis; and wherein the optical wavelength filter is configured to receive a light beam having first and second wavelengths from the first micro-collimator and to transmit the first wavelength to the second micro-collimator along the first axis while reflecting the second wavelength to the third micro-collimator along the second axis.

Another aspect of the disclosure is a method of forming a micro-optical system, including the steps of: a) inserting at least one optical element into a bore of a glass tube that has a body, a front end, a back end, an outer surface, and a tube central axis, wherein the bore runs through the body between the front end and the back end and has a bore axis, wherein the outer surface has a maximum outer dimension in the range from 0.125 mm to 5 mm and includes at least one flat side; and b) securing the optical element within the bore, wherein the optical element defines an optical axis.

Another aspect of the disclosure is a method of forming a micro-optical assembly by securing at least one micro-optical system to an upper surface of a substrate at the flat side of the glass tube. An example micro-optical assembly includes the aforementioned WDM micro-optical assembly wherein the at least one micro-optical system includes first, second and third micro-optical systems each configured as a micro-collimator. The method includes: arranging the first and second micro-collimators to face each other along a first axis with an optical wavelength filter in between while disposing the third micro-collimator along a second axis defined by the optical wavelength filter and that makes an angle with the first axis so that the optical wavelength filter is configured to receive a light beam having first and second wavelengths from the first micro-collimator and transmit the first wavelength to the second micro-collimator along the first axis while reflecting the second wavelength to the third micro-collimator along the second axis.

Another aspect of the disclosure is the method as described above, and further including enclosing the micro-optical assembly in a housing, wherein the housing has a length dimension LM, a width dimension WM and a height dimension HM, and wherein 30 mm≤LM≤41 mm and 14 mm≤WM≤28 mm and 5 mm≤HM≤6 mm.

Another aspect of the disclosure is a micro-collimator micro-optical system that includes: a glass tube having a body, a front end, a back end, an outer surface, and a bore that runs through the body between the front end and the back end, wherein the outer surface has a maximum outer dimension in the range from 0.1 mm microns to 10 mm and includes at least one flat side, and wherein the body has a length between 5 mm and 20 mm; a collimating lens arranged in the bore adjacent the front end of the glass tube; and an optical fiber pigtail operably arranged at least partially within the bore adjacent the back end of the glass tube, wherein the collimating lens and optical fiber pigtail are axially spaced apart by an axial gap distance.

A glass material can be used as a support substrate for forming complex micro-optical assemblies using a variety of different types of known optical components and support/positioning elements. Laser-formed glass bumps can be formed in the support substrate for positioning and alignment purposes. In an example, the support substrate can be in the form of a support assembly that has a laminated structure that includes at the uppermost layer an IR-absorbing glass. Laminated glass sheets bonded with an adhesive can also be used to provide large blister-type laser-formed bumps at arbitrary locations over the support substrate.

Laser-formed bumps can be used in the micro-optical systems and assemblies for component positioning and/or alignment in several ways. For example, multiple laser-formed bumps can be formed beneath select glass optical components or component carriers (i.e., support/positioning elements) to provide precision optical alignment. Laser-formed bumps can be used as precision mechanical stops for optical components or component carriers that are mounted on the support substrate. For example, two laser bumps can serve as a side or end stop to limit travel of optical components while orienting them parallel to an optical datum. A third laser bump can limit travel in the orthogonal direction, forming a corner pocket into which rectangular optical component carriers can be forced during assembly. The optical component carrier (i.e., a support/positioning element) can include a precision diameter hole. This hole can be positioned over a single laser-formed bump so that the bump becomes a pivot point for angular adjustment of the given optical component on the glass substrate.

Additional features and advantages of embodiments will be set forth in the detailed description which follows, and in part will be apparent to those skilled in the art from that description or recognized by practicing embodiments as described herein, including the detailed description which follows, the claims, as well as the appended drawings.

It is to be understood that both the foregoing general description and the following detailed description present embodiments, and are intended to provide an overview or framework for understanding the nature and character of embodiments as they are claimed. The accompanying drawings are included to provide a further understanding of embodiments, and are incorporated into and constitute a part of this specification. The drawings illustrate various embodiments, and together with the description explain the principles and operations of embodiments. The various sections headings used herein are not intended to be limiting and are used for convenience.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

Cartesian coordinates are provided in some of the drawings for the sake of reference and for ease of discussion and are not intended to be limiting as to direction and orientation.

The term "cylindrical" as used here in its most general sense and can be defined as a three-dimensional object formed by taking a two-dimensional object and projecting it in a direction perpendicular to its surface. Thus, a cylinder as the term is used herein is not limited to having a circular cross-section shape but can have any cross-sectional shape, such as the square cross-sectional shape described below by way of example or the example cross-sectional shapes shown in FIGS. 2A through 2J. In an example, the glass tube described herein can be cylindrical but can also be non-cylindrical, e.g., by having an outer surface whose shape varies with length (e.g., tapered or undulating) and/or by having an inner surface whose shape varies with length (e.g., by the formation of bumps on the inner surface).

The claims as set forth below are incorporated into and constitute part of this Detailed Description.

Glass Tube

Figure 1A:
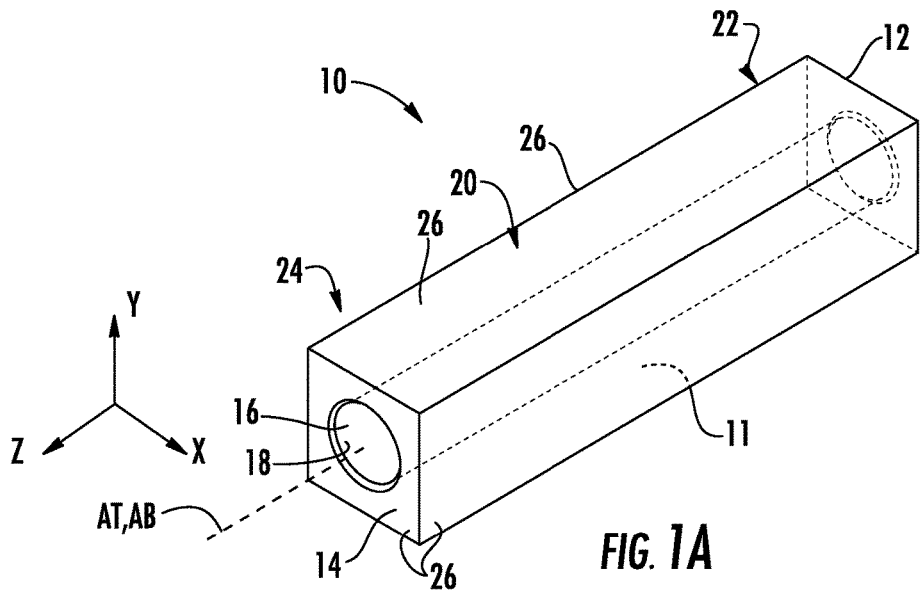
FIGS. 1A, 1B and 1C are top elevated, side and end-on views, respectively, of an example glass tube used to form the micro-optical systems disclosed herein.
Figure 1B:
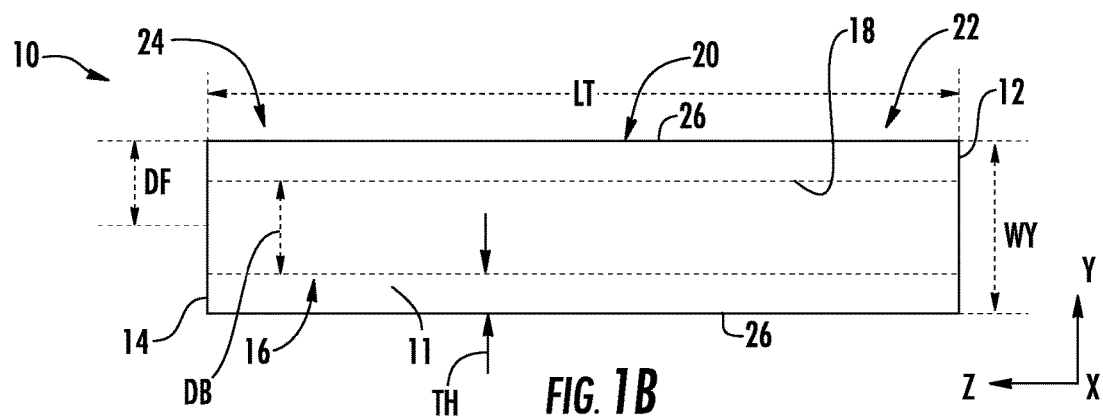
Figure 1C:
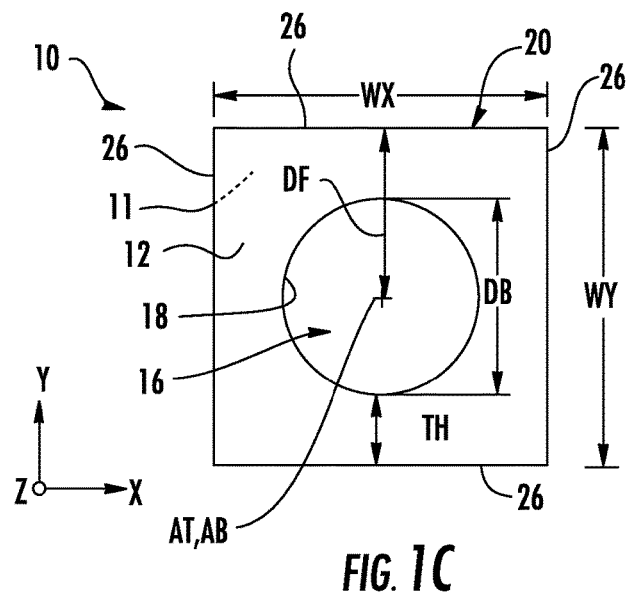

FIG. 1A is a top elevated view, FIG. 1B is a side view and FIG. 1C is an end-on view of an example glass tube 10 used to form the micro-optical systems disclosed herein. The glass tube 10 has a body 11 with a front end 12, a back end 14 and a tube central axis AT. In an example, body 11 is cylindrical. The glass tube also includes a bore 16 that is defined by an inner surface 18 and that has a central bore axis AB. In an example, the bore 16 is centered within the body 11 of the glass tube 10 so that the central bore axis AB is co-axial with the tube central axis AT. In other embodiments, it may be desirable to have the bore 16 off-center relative to the tube central axis AT. In an example, bore 16 is cylindrical with a round cross-sectional shape. Other bore cross-sectional shapes can be employed, including non-cylindrical shapes, depending on the type of optical components operably supported within the bore as described below. For example, it may be advantageous to have a rectangular cross-sectional shape in the case where the optical components are cylindrical or anamorphic lens elements. The glass tube 10 also has an outer surface 20 that defines an x-y cross-sectional shape of the glass tube.

The glass tube 10 has a front-end section 22 that includes the front end 12 and has a back-end section 24 that include the back end 14. The outer surface 20 of the glass tube 10 has at least one flat side 26, with four flat sides 26 shown in FIGS. 1A, 1B and 1C as defining a square cross-sectional shape by way of example.

The glass tube 10 has an axial length LT in the z-direction and widths WX and WY in the x-direction and y-direction, respectively. The bore 16 has a diameter DB. The widths WX and WY and central bore diameter DB define a minimum wall thickness TH for body 11 between the widest portion of the bore 16 and the adjacent portion of the outer surface 20. In an example, WX=WY for a square cross-sectional shape. The central bore axis AB and the at least one flat side 26 define a distance DF, which in examples is known to a precision of 0.05 mm or 0.01 mm or even 0.005 mm. In an example, the smaller of the dimensions WX and WY define a minimum outer dimension of the glass tube 10 while the larger of the dimensions WX and WY defines a maximum outer dimension of the glass tube.

Figure 2A:
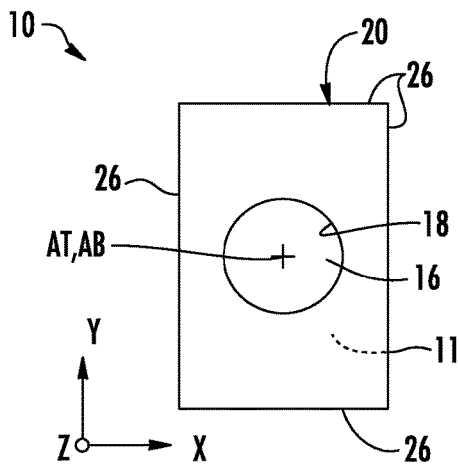
FIGS. 2A through 2J are x-y cross-sectional views of example glass tubes having different cross-sectional shapes.
Figure 2B:
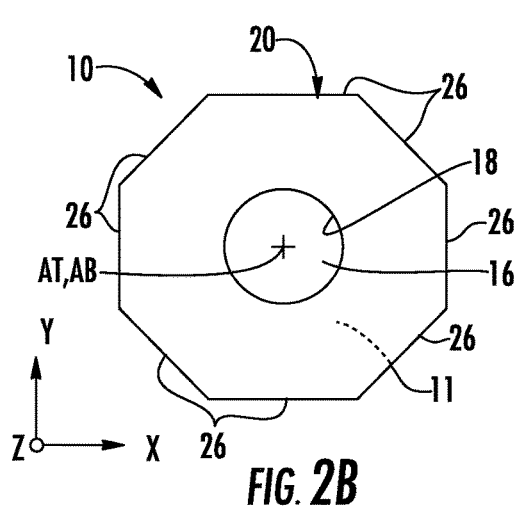
Figure 2C:
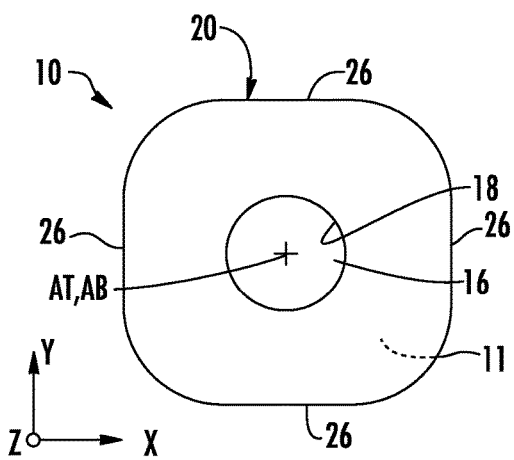
Figure 2D:
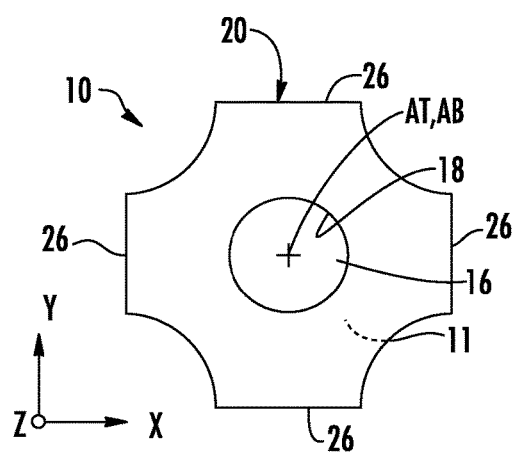
Figure 2E:
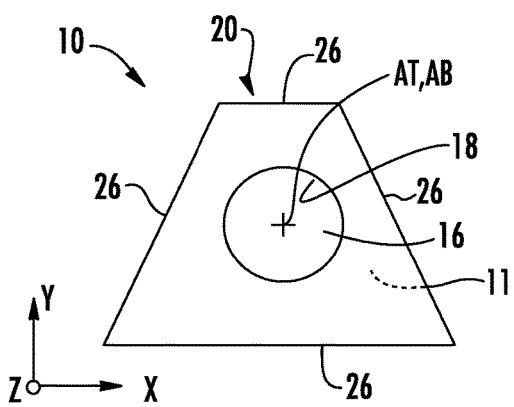
Figure 2F:
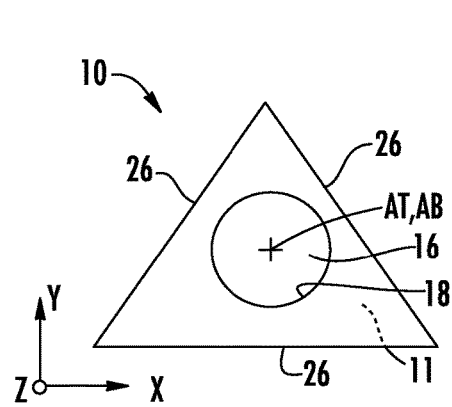
Figure 2G:
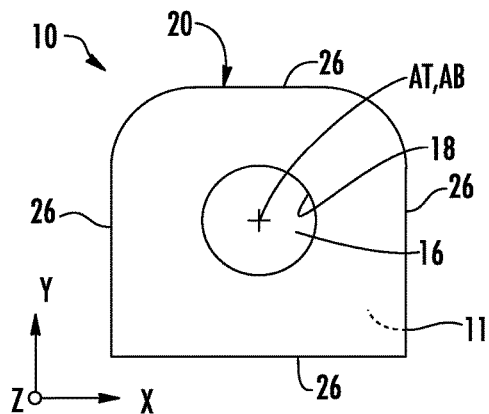
Figure 2H:
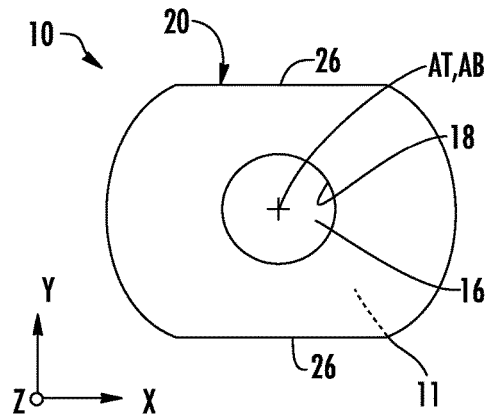
Figure 2I:
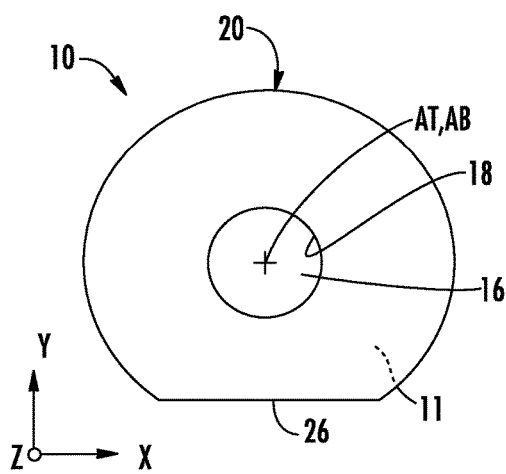
Figure 2J:
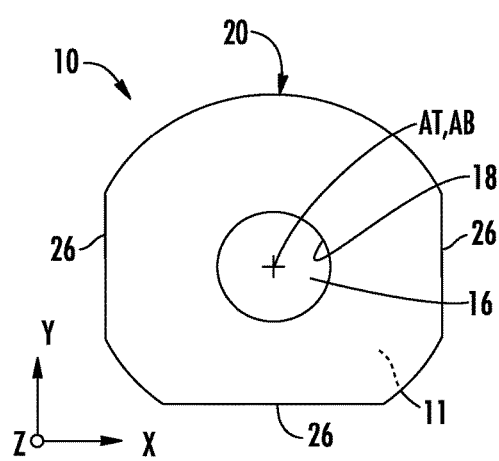

The outer surface 20 of the glass tube 10 can define other cross-sectional shapes, examples of which are shown in FIGS. 2A through 2J. FIG. 2A shows an example of a rectangular cross-sectional shape, which in another example can also be longer in the x-direction than in the y-direction. FIG. 2B shows an example of an octagonal cross-sectional shape that has eight flat sides 26. FIG. 2C shows an example of a rounded square cross-sectional shape that has four flat sides 26. In another example, the rounded corners can be applied to an otherwise rectangular cross-sectional shape. FIG. 2D shows an example of a cross-like cross-sectional shape, which is similar to the rounded square cross-sectional shape of FIG. 2C, except that the corners are concave rounded. FIG. 2E shows an example of a trapezium cross-sectional shape with four flat sides 26. FIG. 2F shows an example of a triangular cross-sectional shape with three flat sides. FIG. 2G shows an example of a partially rounded square cross-sectional shape that includes two rounded corners and floor flat surfaces 26. FIG. 2H shows an example barrel-like cross-sectional shape having two flat sides 26 and two curved sides. FIG. 2I shows an example cross-sectional shape that is generally round but that includes a flat bottom side 26. FIG. 2J is similar to FIG. 2I and shows the addition of two more flat sides 26. It is noted that for those the cross-sectional shapes having multiple flat sides 26, the flat sides need not have the same size.

In an example, WX and WY, which correspond to flat sides 26 of the glass tube 10, have a maximum dimension, or width, measured in a plane that is perpendicular to the tube central axis AT, that is in the range from about 0.1 mm to about 20 mm. In another example, the maximum dimension, or width, is in the range from about 0.1 mm to about 10 mm. In yet another example, the maximum dimension, or width, is in the range from about 0.125 mm to about 5 mm. In yet another embodiment, the maximum dimension, or width, is in the range from about 0.125 mm to about 2 mm. As noted above, the width of WX and WY is measured in a plane that is perpendicular to the tube central axis AT. WX and WY may each have a uniform width along the entire length LT of the glass tube 10 in the case of a cylindrical glass tube 10. Alternatively, WX and WY may have multiple or varied widths in the case of a non-cylindrical glass tube 10.

Further in an example, the diameter DB is in the range from 50 microns to 1 cm, or more preferably 125 microns to 1.8 mm, with the condition that DB<WX, WY and further that the minimum wall thickness TH be at least 0.1 mm, although the wall thickness TH may be smaller in some embodiments (e.g., as small as 0.01 mm). An example length LT is from 1 mm to 20 mm, or between 5 mm and 20 mm or between 5 mm and 10 mm. In an example where the widths WX=WY=W, the diameter DB can be in the range $(0.3)W \leq DB \leq (0.8)W$.

In one specific example, the widths WX=WY=1.8 mm with a tolerance of 50 microns (0.05 mm) while the bore diameter DB is 1.010 mm with a tolerance of 5 microns (0.005 mm), and the length LT is 8 mm. This defines a minimum wall thickness TH=0.4 mm. These tolerances, along with the aforementioned tolerance on the minimum distance D between the bore central axis AB and the at least one flat side 26, makes the glass tube 10 a good support member for supporting optical elements to form a micro-optical system and to form a micro-optical assembly, as described below.

Glass Tube Fabrication Process

Figure 3:
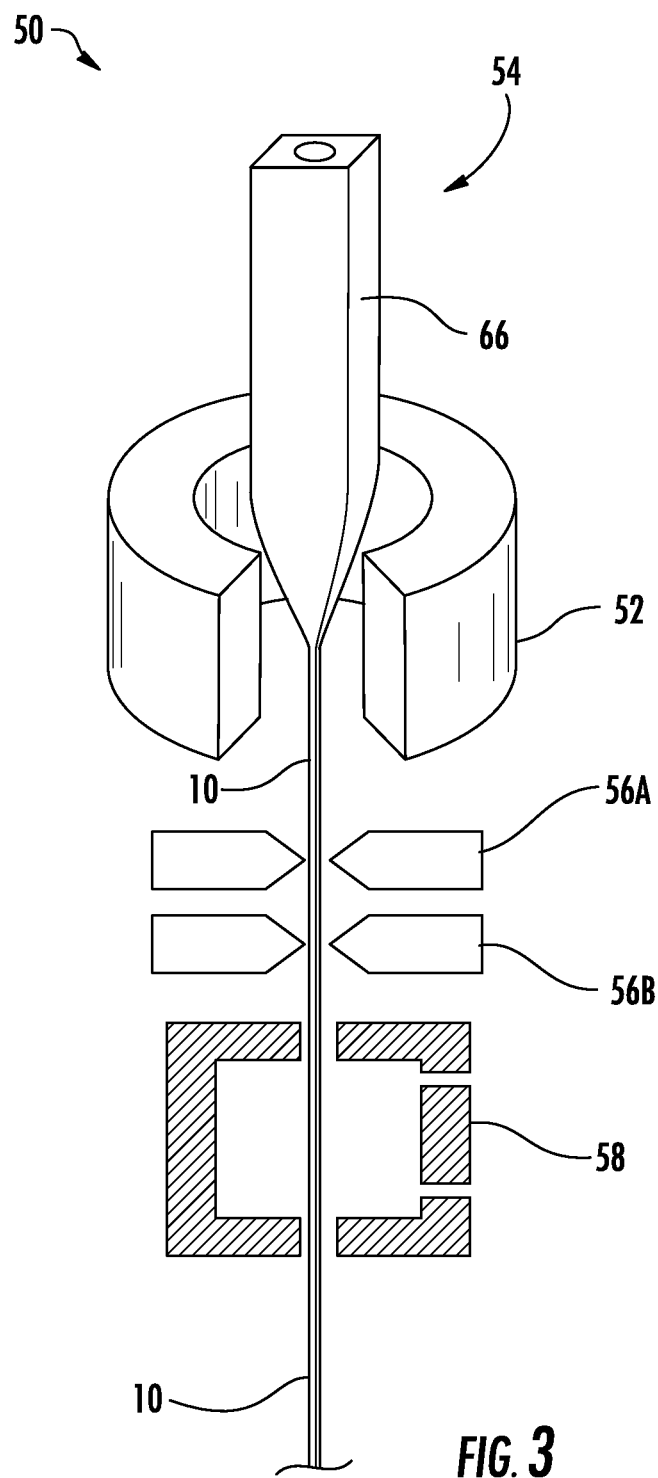
FIG. 3 is a schematic of an example drawing system used to form the glass tubes as disclosed herein.

The glass tube 10 disclosed herein can be fabricated using a drawing process. FIG. 3 is a schematic diagram of an example drawing system 50 for producing the glass tube 10 as disclosed herein. The drawing system 50 may comprise a draw furnace 52 for heating a glass preform 54. The glass preform 54 has generally the same relative shape as glass tube 10 but is much larger, e.g., 25× to 100× larger. Thus, in an example glass preform 54 has at least one flat preform side 66. The glass preform 54 can be made using a large, uniform piece of glass. An example of such a glass is a borosilicate glass. Another type of glass is fused quartz. Other types of glasses can also be effectively employed.

The large piece of glass is machined to have the desired shape, e.g., a square cross-sectional shape. In addition, the large piece of glass can be drilled to form a central bore having a diameter that is properly centered and proportioned to give the resulting glass preform 54 the correct ratio of the bore diameter DB to outer dimensions WX and WY. In an example, at least a portion of the glass preform 54 can be polished (e.g., laser polished), e.g., the at least one flat preform side 66 can be polished. The configuration of the glass preform 54 and the various drawing parameters (draw speed, temperature, tension, cooling rate, etc.) dictate the final form of the glass tube 10.

In the fabrication process, the drawn glass preform 54 exits the draw furnace 52 and as the general form of the glass tube 10 but is one long continuous glass tube. After the glass tube 10 exits the draw furnace 52, the dimensions WX and WY may be measured using non-contact sensors 56A and 56B. Tension may be applied to the glass tube by any suitable tension-applying mechanism known in the art.

After the dimensions and tension of the glass tube 10 are measured, the glass tube may be passed through a cooling mechanism 58 that provides slow cooling of the glass tube. In one embodiment, the cooling mechanism 58 is filled with a gas that facilitates cooling of the glass tube at a rate slower than cooling the glass tube in air at ambient temperatures.

Once the glass tube 10 exits the cooling mechanism 58, it can be cut into select lengths called "canes" that are relatively long (tens of millimeters to 1.5 m) and then cut again into the smaller lengths to define the individual glass tubes 10 as shown in FIG. 1A. When the drawn glass tube 10 has outer dimensions WX and WY smaller than about 1 mm, it can be wound on a spool. For larger outer dimensions, the drawing glass tube 10 may be too stiff to wind onto a spool, in which case it is preferred to receive and cut the drawn glass tube into the smaller lengths after it leaves the cooling mechanism 58.

In an example, the glass tubes 10 can be fabricated by performing a first draw process using glass preform 54 to form an intermediate-sized glass preform, and then re-drawing the intermediate-sized glass preform using a second draw process to form the glass tubes 10.

The glass-tube-forming process defines the glass tube 10 with the bore 16 well-positioned with respect to the central axis AC (e.g., co-axial therewith) and with the outer surface 20 including the least one flat side 26.

Micro-Optical System

Figure 4A:
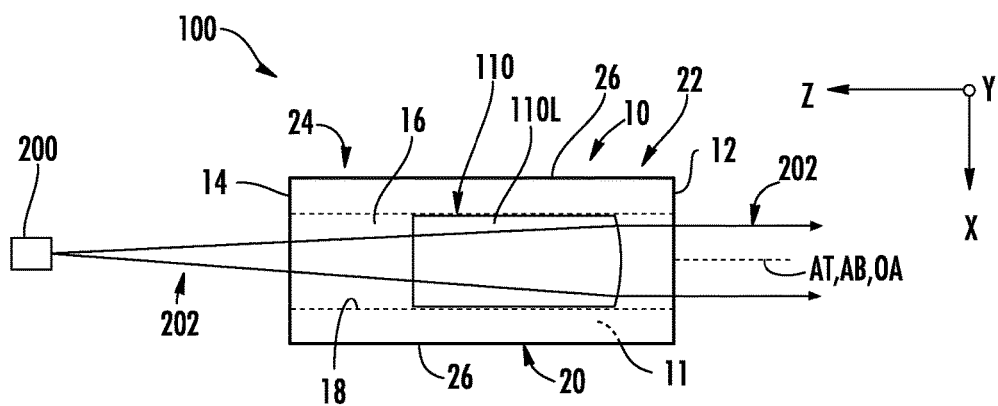
FIG. 4A is a top-down view of an example micro-optical system wherein the glass tube supports a single lens element.
Figure 4B:
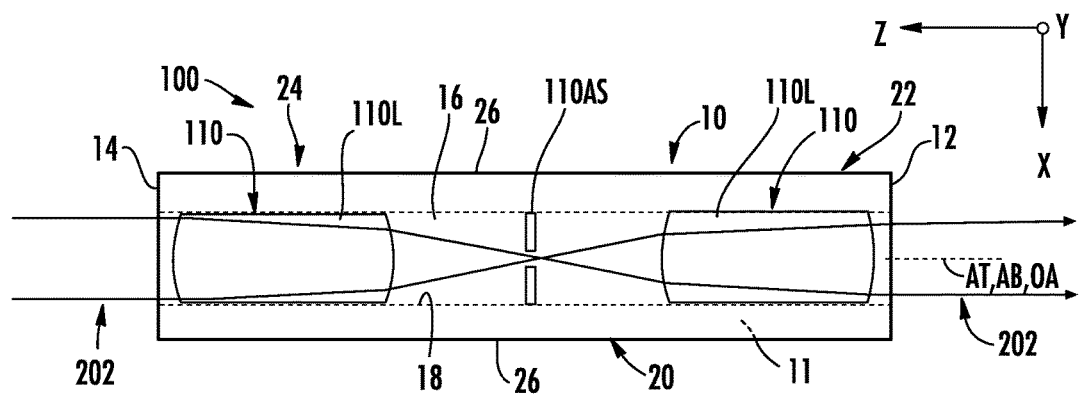
FIG. 4B is a top-down view of an example micro-optical system wherein the glass tube supports two lens elements and an aperture stop arranged midway between the two lens elements to form an afocal 1× relay system.
Figure 4C:
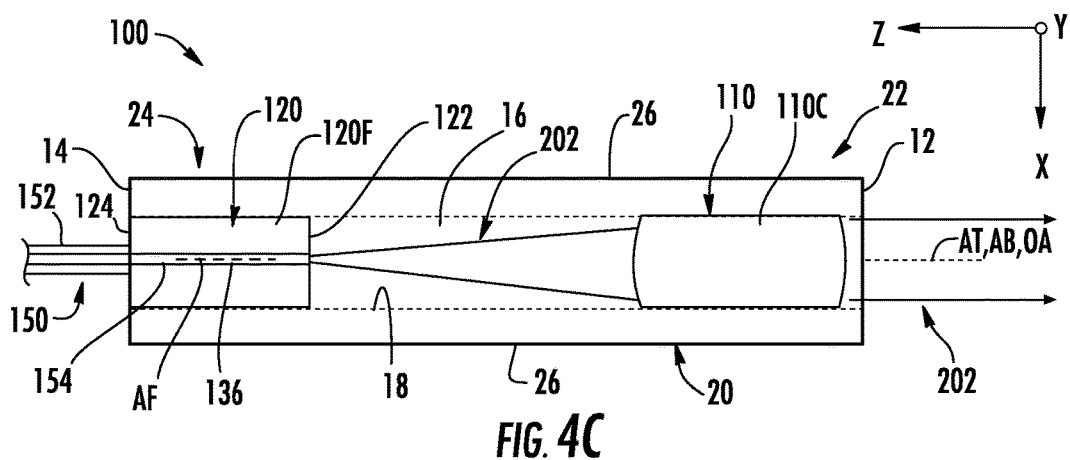
FIG. 4C is a top-down view of an example micro-optical system wherein the glass tube supports a collimating lens and an optical fiber support member that supports an end portion of an optical fiber to form a collimator micro-optical system.

FIGS. 4A through 4C are top-down views of example micro-optical systems 100 as disclosed herein. The micro-optical system 100 includes the glass tube 10 as described above and used as a support member to operably support at least one optical element 110 at least partially within the bore 16. The micro-optical system 100 an optical axis OA defined by the at least one optical element. The optical element can include, but is not limited to, one or more of the following: a lens element (lens), an optical filter (wavelength or neutral density), a polarizer, a phase plate, a gradient-index (GRIN) element, a light-redirecting element (e.g., a mirror or a grating), a diffractive lens element, a hybrid lens element (i.e., diffractive and refractive), a ferroelectric element, an aperture, and a section of an optical fiber. In an example, the glass tube 10 can also support one or more support/positioning elements, such as a lens holder, a fiber holder (i.e., a ferrule), mechanical stops for lens positioning, etc.

In an example, the micro-optical system 100 includes multiple optical elements 110 operably disposed at least partially within the bore 16. The at least one flat side 26 of glass tube 10 serves as a reference surface with respect to either the tube central axis AT, the central bore axis AB or the optical axis OA. In an example, the at least one flat side 26 is polished.

FIG. 4A shows an example micro-optical system 100 wherein the glass tube 10 operably supports a single optical element 110 in the form of a lens element 110L. The micro-optical system 100 of FIG. 4A is shown arranged adjacent a light source 200 such as a laser that emits light 202. The single lens element 110L can be a gradient-index optical element, a conventional lens element, an aspherical lens element, an anamorphic optical element, etc.

FIG. 4B shows an example micro-optical system 100 wherein the glass tube 10 supports two lens elements 110L, with one in the front-end section 22 and one and one in the back-end section 24. An aperture-stop optical element 110AS is operably disposed midway between the two lens elements 100L. The micro-optical system 100 of FIG. 4B defines a micro-optical 1× afocal relay system.

FIG. 4C shows an example micro-optical system 100 wherein the glass tube 110 operably supports a collimating lens 110C in the front-end section 22 of the glass tube and also supports an optical fiber support member 120 in the form of a ferrule 120F that has a front end 122 and back end 124 and a central bore 136 that operably supports an end portion 154 of an optical fiber 150. The micro-optical system 100 of FIG. 4C defines a collimator micro-optical system, which is referred to hereinafter as a "micro-collimator".

Figure 4D:
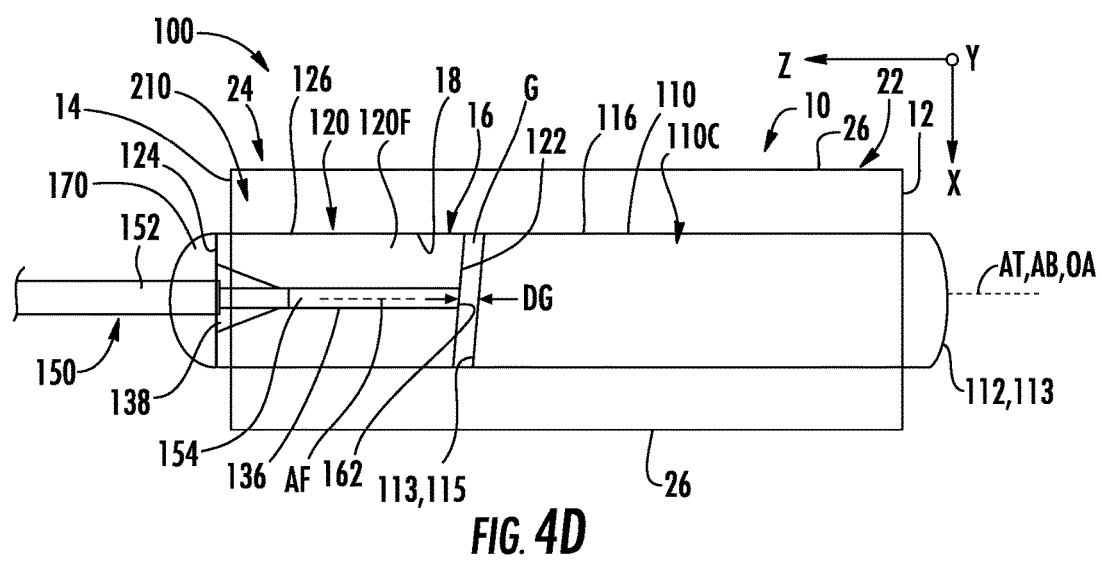
FIG. 4D is a top-down view similar to that of FIG. 4C and shows a more detailed example of the collimator micro-optical system of FIG. 4C.

FIG. 4D is a more detailed top-down view of an example of the micro-collimator 100 shown in FIG. 4C. The collimating lens 110C has a front end 112 with a front surface 113, a back end 114 with a back surface 115, and a perimeter 116. In the example shown, the front surface 113 is convex while the back surface 115 can be an angled, e.g., in the x-z plane as shown. In an example, the front surface 113 of collimating lens 110C can reside outside of the bore 16, i.e., the front-end portion of the collimating lens 110C can extend slightly past the front end 12 of the glass tube 10. In an example, the collimating lens 110C can be formed as a gradient-index (GRIN) element that has a planar front surface 113. In an example, the collimating lens 110C can consist of a single lens element while in another example it can consist of multiple lens elements. In the discussion below, the collimating lens 110C is shown as a single lens element for ease of illustration and discussion.

The optical fiber support member 120 is the form of a ferrule 120F. The ferrule 120F has a front end 122, a back end 124 and a perimeter 126. The ferrule 120F includes a central bore 136 that runs between the front end 122 and the back end 124 along a ferrule central axis AF, which in an example is co-axial with the tube central axis AT of the glass tube 10 and the optical axis OA as defined by the collimating lens 110C. The central bore 136 can include a flared portion 138 at the back end 124 of the ferrule 120F.

The optical fiber 150 has a coated portion 152 and while the end portion 154 is bare glass (i.e., is stripped of the coated portion) and so is referred to hereinafter as the "bare glass portion." The bare glass portion 154 includes a polished end face 162 that defines a proximal end of the optical fiber. The bare glass portion 154 of the optical fiber 150 extends into the central bore 136 of the ferrule 120F at the back end 124 of the ferrule. A securing element 170 can be disposed around the optical fiber 150 at the back end 124 of the ferrule 120F to secure the optical fiber to the ferrule. In an example micro-collimator 100 of FIG. 4D, the front end 122 of the ferrule 120F is angled in the x-z plane and is axially spaced apart from the angled back end 115 of the collimating lens 110C to define a gap G that has a corresponding axial gap distance DG.

The ferrule 120F, optical fiber 150 and securing element 170 constitute an optical fiber pigtail 210, which can be said to reside at least partially within bore 26 adjacent the back end 14 of the glass tube 10. Thus, in an example, the micro-collimator 100 consists of only three parts: the glass tube 10, the collimating lens 110C and the optical fiber pigtail 210. The glass tube 10 serves in one capacity as small lens barrel that support and protects the collimating lens 110C and optical fiber pigtail 210, particularly the bare glass portion 154 and its polished end face 162. The glass tube 10 also serves in another capacity as a mounting member that allows for the micro-collimator 100 to be mounted to a support substrate, as described in greater detail below. In this capacity, the at least one flat surface 26 serves as a precision mounting surface.

In an example, the glass tube 10, the collimating lens 110C and the ferrule 120F are all made of a glass material, and further in an example are all made of the same glass material. Making the glass tube 10, the collimating lens 110C and the ferrule 120F out of a glass material has the benefit that these components will have very close if not identical coefficients of thermal expansion (CTE). This feature is particular advantageous in environments that can experience large swings in temperature.

In an example, the optical elements 110 used in micro-optical systems 100 are sized to be slightly smaller than the diameter DB of bore 16 (e.g., by a few microns or tens of microns) so that the optical elements can be inserted into the bore and be movable within the bore to a select location. In an example, the select location is an axial position where optical element 110 resides for the micro-optical system to have optimum or substantially optimum optical performance. Here, substantially optimum performance means performance that may not be optimum but that is within a performance or specification for the micro-optical system.

In an example, the optical elements 110 have a clearance with respect to the bore 16 in the range of a few microns (e.g., 2 microns or 3 microns) to tens of microns (e.g., 20 microns up to 50 microns). A relatively small value for the clearance allows for the optical elements 110 to be well-aligned with the central bore axis AB, e.g., to within a few microns (e.g., from 2 microns to 5 microns).

The optical elements 110 and the support/positioning elements 120 can be inserted into and moved within bore 16 to their select locations using micro-positioning devices. The optical elements 110 and the support/positioning elements 120 can be secured within the bore 16 using a number of securing techniques. One example securing technique uses a securing feature that is an adhesive (e.g., a curable epoxy). Another securing technique uses a securing feature that involves a glass soldering to create one or more glass solder points. Another securing technique uses glass welding to create a securing feature in the form of one or more glass welding points. A combination of these securing features can also be employed.

Thus, one or more optical elements 110 can be secured within the bore 16 using a securing feature and can also be supported and/or positioned using one or more support/positioning elements 120. The non-adhesive securing techniques described below allow for the micro-optical systems 100 disclosed herein to be free of adhesives so that example micro-optical systems can consist of glass only.

Micro-Optical System Adjustment

Figure 5A:
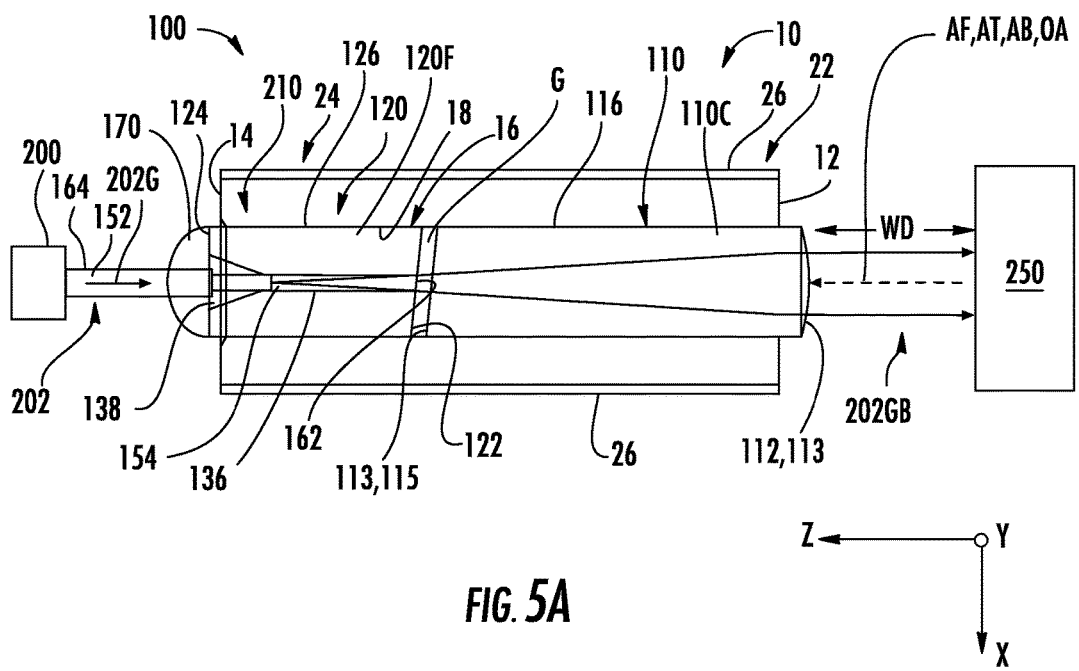
FIG. 5A is a top down view of the collimator micro-optical system of FIG. 4D operably disposed adjacent a beam profiler used in connection with adjusting the position of the optical elements of the collimator micro-optical system to improve or optimize its performance.

FIG. 5A is a top-down view of the micro-collimator 100 of FIG. 4D operably disposed adjacent a beam profiler 250 used in connection with adjusting the position of one or more optical elements 110 and/or one or more support/positioning elements 120 of the micro-optical systems 100 disclosed herein to improve or optimize their performance. The adjustment methods are described using the micro-collimator 100 for the sake of illustration and is not limited to just the micro-collimator embodiment.

In FIG. 5A, a light source 200 is optically coupled to the optical fiber 150 at its distal end 164. The light source 200 emits light 202 that travels through the optical fiber 150 as guided light 202G. The guide light 202G exits the polished end face 162 of the optical fiber as light 202. The light 202 diverges as it passes through the central bore 156 of ferrule 140 and through the gap G and then through the back surface 115 of the back end 114 of the collimating lens 110C. The divergent light 202 travels through the body of the collimating lens 110C to its front surface 113, where the light refracts and becomes substantially collimated. This collimated light 202 defines a Gaussian light beam 202GB. The Gaussian light beam 202GB may be wider in one direction (e.g., the x-direction) than the other direction (i.e., may have an elongate cross-sectional intensity distribution), depending on the light source 200 employed.

The Gaussian light beam 202GB is directed to the beam profiler 250. The beam profiler 250 is located at a fixed position in front of the micro-optical system 10 at a working distance WD along the tube central axis AT. The beam profiler 250 captures an image of the Gaussian beam 202GB, which includes information about the configuration of micro-optical system 100. The axial gap distance DG between the optical fiber pigtail 210 and the collimating lens 110C is adjusted in accordance with captured Gaussian beam image feedback and a calculation of the propagation of the Gaussian beam 202GB over the working distance DG until the optimum beam image is obtained by the beam profiler 250. In an example, an optimum Gaussian beam image is the image that has the most uniform intensity distribution and that most closely resembles the theoretical Gaussian intensity distribution based on the light source 200 and the design of the micro-collimator 100. The gap distance DG that provides the optimum Gaussian beam image is taken as the optimum configuration of the micro-optical system 100. Because the glass tube 10 is formed with high precision, there is typically no need to perform a lateral adjustment of either or both of the collimating lens 110C and the optical fiber pigtail 210.

The transparency of the glass tube 10 provides a number of advantages when assembling the micro-optical system 100 either manually or via an automated process. First, gap G between the collimating lens 110C and the ferrule 140 can be seen through the glass tube 10. This allows for machine-vision viewing or microscope viewing of the gap G through the glass tube 10 to check for overall appearance and cleanliness of the optical surfaces as well as for measuring the gap distance DG. Also, as discussed below, it allows for optical-based means to arrange and/or secure the optical components within the bore 16. These optical-based means include UV curing, laser welding, laser-based glass soldering and laser-based glass bump formation.

Figure 5B:
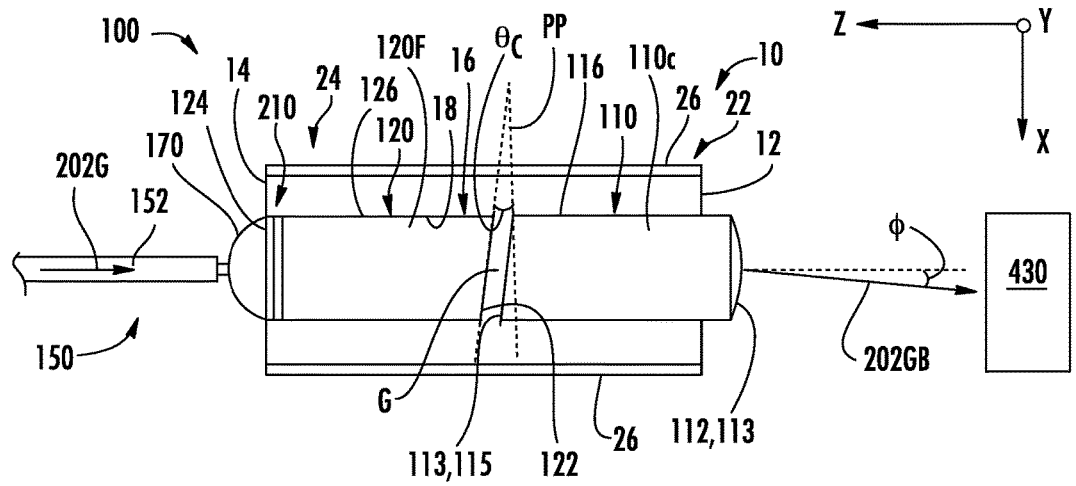
FIG. 5B is a top-down view of the collimator micro-optical system of FIG. 5A and shows a surface angle $\theta_C$ of the back surface of the collimating lens and the corresponding pointing angle $\phi$ of the outputted Gaussian beam relative to the optical axis OA.

FIG. 5B is a top-down view of the micro-collimator 100 of FIG. 5A arranged relative to an optical filter 430. FIG. 5B shows the surface angle $\theta_C$ of the back surface 115 of the collimating lens 110C at the back end 114 of the collimating lens 110C. In an example, the front end 122 of ferrule 120F can have the same surface angle $\theta_C$ as shown. FIG. 5B also shows the corresponding pointing angle $\phi$ of the outputted Gaussian beam 202GB relative to the optical axis OA. In an example, the surface angle $\theta_C$ is measured relative to a line or plane PP that is perpendicular to the optical axis OA. In an example, the surface angle $\theta_C$ is between 6° and 10°, e.g., 8°. This angled back surface 115 defines the pointing angle $\phi$ of the outputted Gaussian beam 202GB relative to the optical axis OA. In an example shown in FIG. 5B, when the surface angle $\theta_C$ resides in the horizontal (x-z) plane, then the pointing angle $\phi$ also resides in the horizontal plane. The beam pointing angle $\phi$ can be selected based on the particular application of the micro-collimator 100. For example, in a free-space passive optical system such as a WDM micro-optical assembly introduced and discussed below, the beam pointing angle can be used effectively to direct the light to travel between filters and mirrors to achieve optimum optical coupling and performance.

Figure 6:
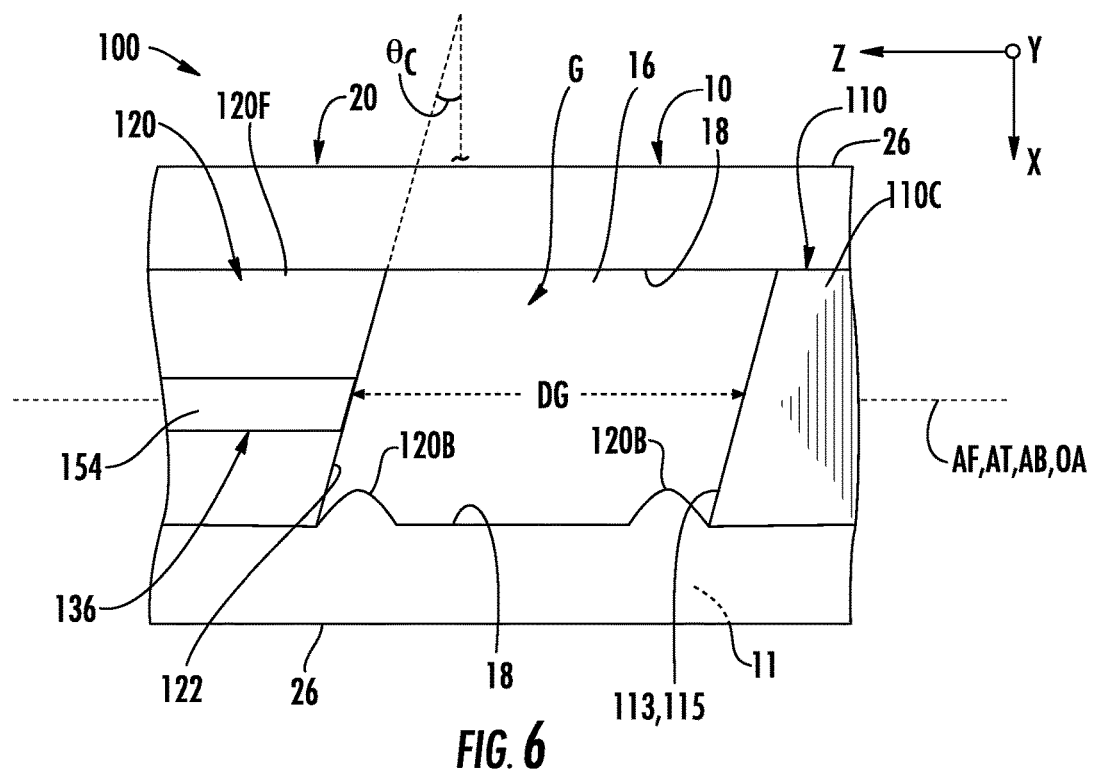
FIG. 6 is close-up x-z cross-sectional view of the central portion of the collimator micro-optical system showing the gap G and the corresponding axial gap distance DG that separates the collimating lens from the ferrule.

FIG. 6 is close-up top-down view of the central portion of the micro-collimator 100 that shows the gap G and the corresponding axial gap distance DG that separates the back surface 115 of the collimating lens 110C from the front end 122 of the ferrule 120F. The close-up view of FIG. 6 illustrates an alternative to using the beam profiler 250 to set the gap distance DG and also shows an alternative to having to add as separate pieces one or more support/positioning elements 120 in the form of mechanical stops to control the position of the optical elements 110 within the bore 16 of the glass tube 10.

In particular, FIG. 6 shows support/positioning elements 120 in the form of bumps 120B. The bumps 120B are localized protrusions integrally formed in the glass body 11 of the glass tube 10 at inner surface 18 and that serve as mechanical stops. In an example, the bumps 120B are formed using laser-induced bump formation. Laser-induced bump formation is known in the art and is described for example in U.S. Pat. Nos. 7,480,432 and 8,291,729 and 8,397,537 and 9,359,252, which are incorporated by reference herein.

Figure 7A:
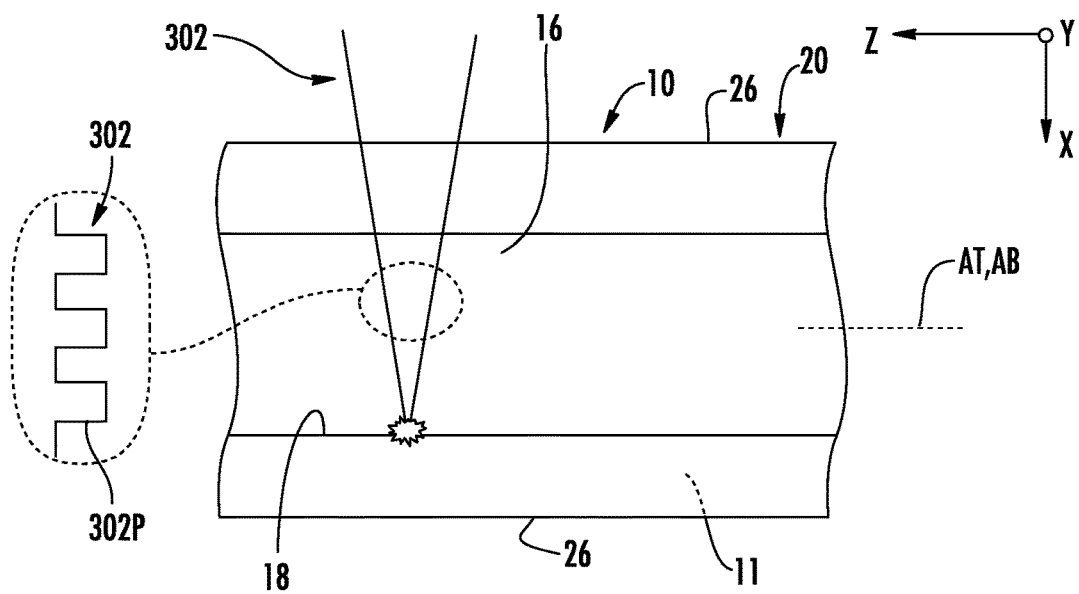
FIGS. 7A and 7B are similar to FIG. 6 and illustrate the formation of a mechanical stop in the inner surface of the glass tube using laser-induced bump formation.
Figure 7B:
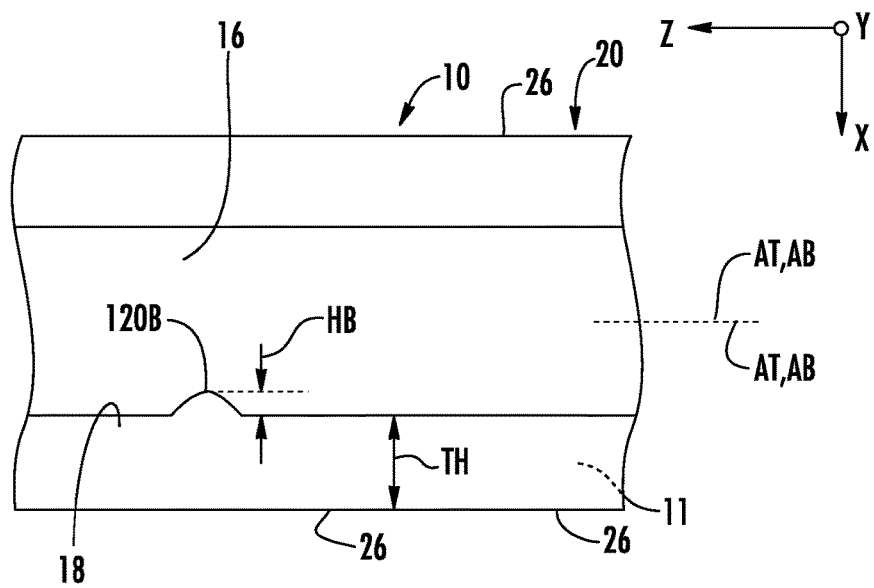

FIGS. 7A and 7B are similar to FIG. 6 and illustrate the formation of a bump 120B using laser-induced bump formation. The bump 120B is created by exposing with a laser beam 302 a select location of the body 11 of glass tube 10 near inner surface 18 to a laser beam 302. The laser beam 302 can have a wavelength in the UV to IR range, with the latter wavelength being especially useful if the glass material of glass tube 10 contains an IR-absorbing metal such as iron or titanium. In an example, the laser beam 302 can be pulsed, with light pulses 302P (see close-up inset) that are a few picoseconds to tens of nanoseconds in duration, with 10 picoseconds being an exemplary pulse duration.

The laser beam 302 is focused at or just below the inner surface 18 and thus within the body 11 of the glass tube 10. This induces a heating process in the glass body 11 that locally swells the glass material to form a hemispherical bump 120B of height HB at the inner surface 18 within the bore 16. The bump 120B so formed at a select location defines a mechanical stop for the given optical element 110. In an example, the bump height HB can be as high as about 10% of the glass body thickness where the bump is formed. The bump height HB can be precisely controlled by controlling the power of the laser beam 302.

The bump height HB of bump 120B need only be greater than the clearance of the optical elements 110 with respect to the bore 16 to restrict the axial movement of the optical element 110 within the bore 16. Because the shape of the bump 120B is substantially hemispherical, the desired gap spacing DG needs to account for where the bump 120B will contact the optical element 110.

If the glass tube 10 is only to accommodate two optical elements 110 whose gap distance DG is to be precisely controlled (such as in the case of the above-described micro-collimator 100), the laser-formed bumps 120B can be made prior to insertion of the optical elements. If there are multiple optical elements 110 and corresponding gaps therebetween, then one or more of the optical elements will need to be inserted into the bore 16 prior to forming the bumps 120B.

A bump 120B can also service as a rotational alignment mark if the optical element 110 has a corresponding groove slightly smaller than the bump. The optical element 110 can then be rotated so that the groove locks into place with the bump 120B at a proper design angle. This is important for certain types of optical elements, such as polarizers and birefringence plates, that are directional (i.e., that have an axis of symmetry) and that need to be arranged with a select azimuthal orientation.

The bumps 120B can also be formed in a manner that provides for lateral adjustment of an optical component within the bore 16 of glass tube 18. This may be necessary, for example, if a manufacturing error results in the flat sides 26 of the outer surface 20 of the glass tube 10 not being perfectly aligned to the tube central axis AT or to the central bore axis AB. In this case, three or more glass bumps 120B can be formed on the inner surface 18 so that the tops of the three bumps form a reference plane that is parallel to the tube central axis AT or the bore central axis AB and at a predefined offset distance thereto. This process can also be performed with reference to the optical axis OA of the micro-optical system 100. In an example, the tube central axis AT, the bore central axis AB and the optical axis OA are all substantially collinear, i.e., to within the design tolerances of the micro-optical system 100.

The formation of bumps 120B to laterally adjust the position of an optical component 110 within the bore 16 of glass tube 10 requires having information about the location of at least one flat side 26 of the glass tube relative to the axis of interest, i.e., relative to either the tube central axis AT, the central bore axis AB or the optical axis OA defined by the one or more optical components 110 in the bore 16. An accurate measurement of the location of a flat side 26 of the glass tube 10 relative to a select axis AT, AB or OA can be made using, for example a scanning laser profilometer. To obtain such a measurement, the glass tube 10 can be mounted on a precision metal or glass rod that had its position previously characterized, possibly using the same scanning laser profilometer. The glass tube 10 is then rotated on the rod so that the flat side 26 of interest faces the scanning laser profilometer. Based on profilometer measurements, a plot of surface error between the actual surface and the desired surface position can be generated. At least three locations can then be selected where laser bumps 120B can be grown to a bump height HB equal to the measured surface error. Processes for precision laser bump growth have been demonstrated over a range 0 to 100 microns with a precision of 0.5 microns.

In an example, after glass bump 120B is formed, the lateral displacement of the given optical element 110 displaced by the glass bump can be determined, such as by surface measurements (e.g., scanning laser profilometer) or by active optical measurements. If these measurements determine that the glass optical component is not in the correct position, then additional laser irradiation can be used to modify the bump height HB.

Securing the Optical Elements

Figure 8A:
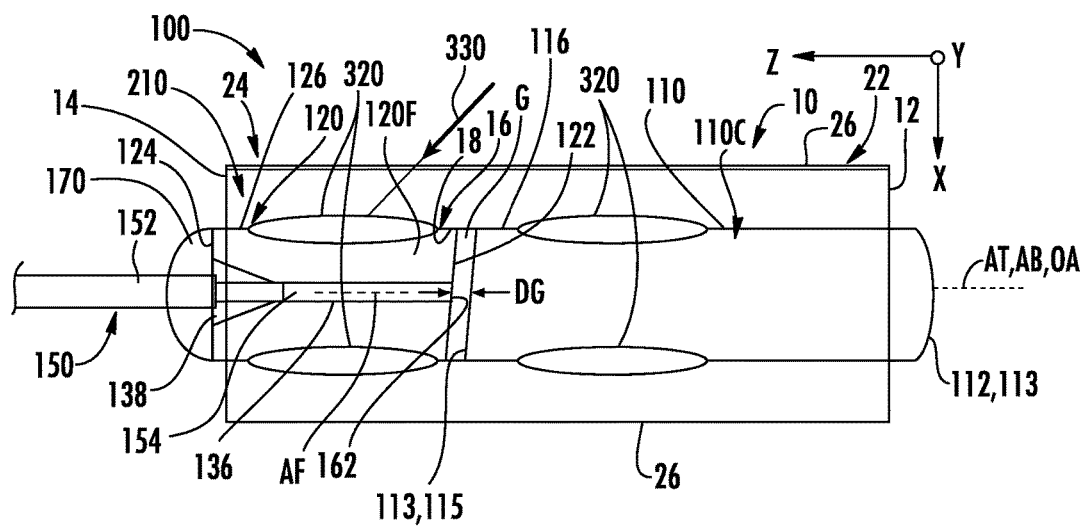
FIG. 8A is a top-down view of the collimator micro-optical system and shows how an adhesive can be used to secure the collimating lens and ferrule within the bore of the glass tube.

As discussed briefly above, the optical elements 110 that constitute the micro-optical system 100 can be secured to the glass tube 10 using a securing mechanism such as an adhesive. FIG. 8A is a top-down view of the micro-collimator 100 and shows how collimating lens 110C and ferrule 120F are secured within the bore 16 of the glass tube 10 using a securing material that is an adhesive 320. The adhesive 320 is disposed in the bore 16 within the clearance space between the perimeter 116 of the collimating lens 110C and the inner surface 18 of the bore. The adhesive is also disposed in the bore 16 in the clearance space between the perimeter 126 of the ferrule 120F and the inner surface 18 of the bore. In an example, the adhesive 320 needs to be activated to cure, e.g., via ultraviolet (UV) light, or by heat.

Once the optical elements 110 and/or the support/positioning elements 120 are in their proper position within the bore 16, the adhesive 320 is then activated. In an example, this is accomplished by transmitting a UV light beam 330 through the body 11 of the glass tube 10 to cure the curable adhesive, thus fixing the optical elements in place. This illustrates one of the advantages of using the transparent glass tube 10 to support the optical elements 110 instead of using an opaque material. In another example, heat is transmitted through the body 11 of glass tube 10 to cure the curable adhesive and fix the optical elements 110 and/or the support/positioning elements 120 in place.

Figure 8B:
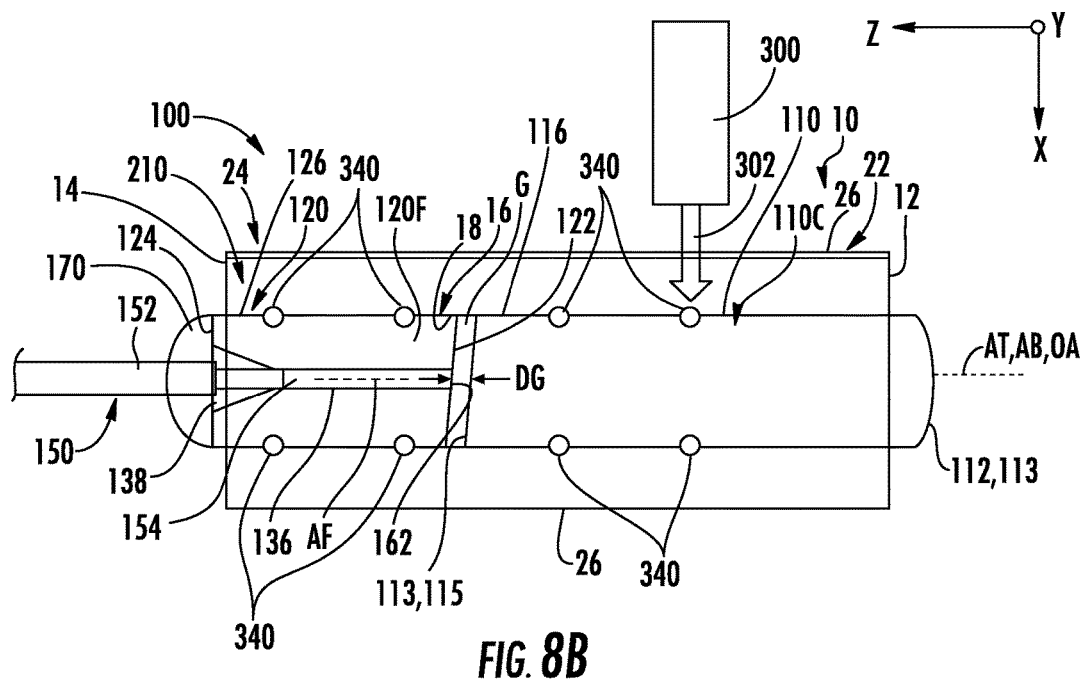
FIG. 8B is top-down view of the collimator micro-optical system and shows how a laser welding process can be used to secure the collimating lens and ferrule within the bore of the glass tube.

FIG. 8B is similar to FIG. 8A and illustrates an example embodiment wherein the laser beam 302 from a laser source 300 is used to perform laser welding to define securing features 340 in the form of laser welding points at the perimeters 116 and 126 of the collimating lens 110C and the ferrule 120F. The laser beam 302 can also be used to define securing features 340 in the form of glass solder points. A combination of these different types of securing features can also be used. The securing features 340 secure the collimating lens 110C and the ferrule 120F to the inner surface 18 within the bore 16 once they are put into their proper (select) locations within the bore as described above.

Micro-Optical Assembly

Figure 9:
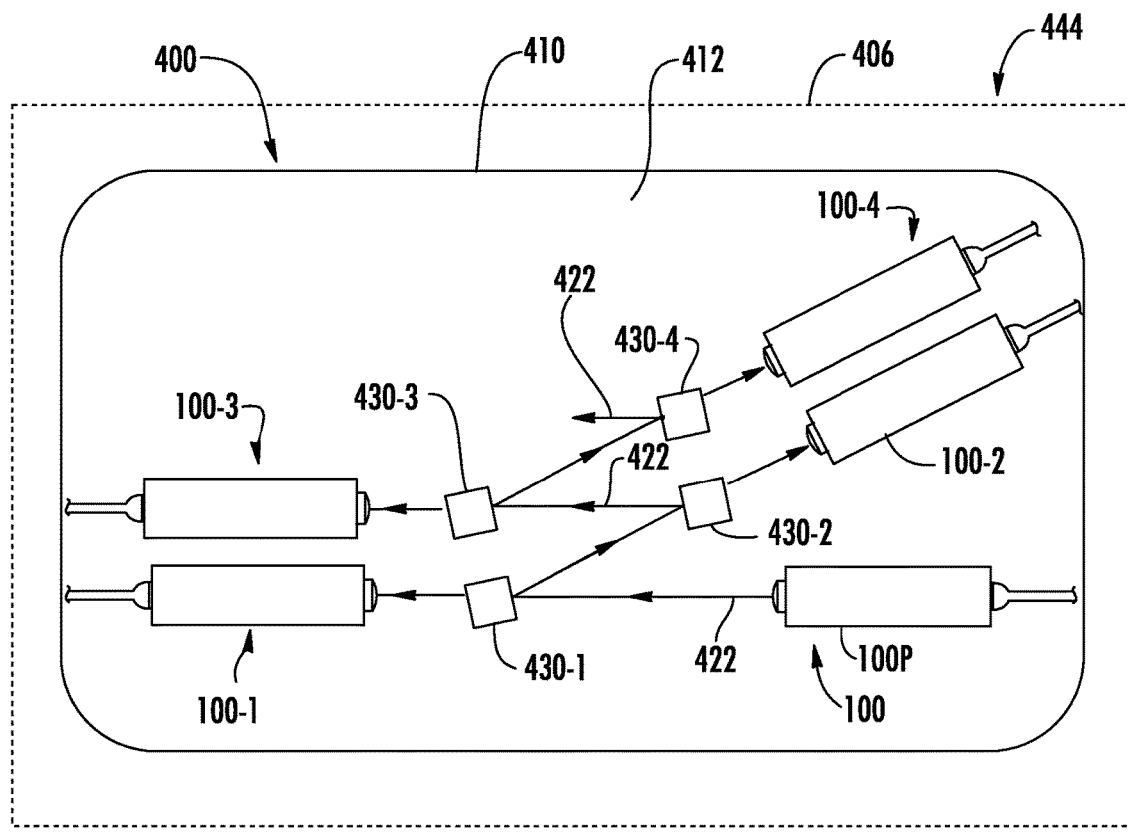
FIG. 9 is a top-down view of an example optical assembly in the form of a four-channel WDM micro-optical assembly that employs five of the collimator micro-optical systems as disclosed herein.

FIG. 9 is a top-down view of an example micro-optical assembly 400. In general, the micro-optical assembly 400 comprises at least one micro-optical assembly optical system 100 supported on the upper surface 412 of substrate 400. In an example, the micro-optical assembly 400 can include a housing 406 that in an example defines a WDM module 444. In an example, the WDM module 444 can have a small form factor as defined by length, width and height dimensions LM, WM and HM in the respective ranges of 30 mm≤LM≤41 mm and 14 mm≤WM≤28 mm and 5 mm≤HM≤6 mm.

The particular example of micro-optical assembly 400 of FIG. 9 is in the form of a four-channel WDM device that employs five of the micro-collimators 100 disclosed herein and so is referred to hereinafter as the WDM micro-optical assembly 400. It is noted that a more basic WDM micro-optical assembly 400 can employ only three micro-collimators 100 and is used to separate or combine two wavelengths. Likewise, more complicated WDM micro-optical assemblies 400 can employ many more micro-collimators 100 to separate or combine many more wavelengths besides two wavelengths or even four wavelengths (e.g., tens or even hundreds of different wavelengths). In examples, the WDM channels can be dense WDM (DWDM) channels or coarse WDM (CWDM) channels.

Other types of micro-optical assemblies 400 besides the WDM micro-optical assembly 400 described herein can also be formed using the basic techniques described herein. For example, the micro-optical assembly 400 can be used to form many types of free-space optical fiber devices, as well as compact variable optical attenuators, switches, optical amplifiers, taps, optical couplers/splitters, optical circulators, optical isolators, optical time-domain reflectometer (OTDRs), etc.

In an example, the support substrate 410 is made of glass (e.g., quartz) or sapphire. In an example, the support substrate 410 is made of a glass that receptive to the formation of glass bumps 120B. In other examples, the support substrate 410 can be made of stainless steel or silicon a low-CTE metal alloy (e.g., having a CTE of <10 ppm/° C. or more preferable CTE<5 ppm/° C., or even more preferably CTE<1 ppm/° C.). Examples of metal alloys having such a low CTE include the nickel-iron alloy 64FeNi also known in the art under the registered trademarked INVAR® alloy or the nickel-cobalt ferrous alloy known in the art under the registered trademark KOVAR® alloy. In an example, the upper surface 412 is precision polished to be flat to within a tolerance of 0.005 mm so that the micro-optical system 100 can be precision mounted to the upper surface using the at least one flat surface 26. As discussed above, the at least one flat surface 26 can be processed (e.g., polished, including laser performing laser polishing) to a tolerance similar to that of the upper surface 412 of the support substrate 410. In an example, the support substrate 410 includes one or more reference features 416, such as alignment fiducials, for positioning and/or aligning the micro-collimators 100 and other optical components (e.g., optical filters) as described below.

With continuing reference to FIG. 9, the micro-collimators 100 are individually denoted 100P and 100-1, 100-2, 100-3 and 100-4 and are arranged as shown. The micro-collimator 100P serves as an input/output (I/O) port for multi-wavelength light 422 having wavelengths $\lambda_1$ to $\lambda_4$ while the micro-collimators 100-1, 100-2, 100-3 and 100-4 serve as the four individual channel ports. The I/O micro-collimator 100P and the first micro-collimator 100-1 are disposed facing each other along a first axis A1. The micro-optical assembly 400 also includes four optical filters 430-1, 430-2, 430-3 and 430-4 operably arranged relative to the micro-optical systems 100 and respectively configured to transmit wavelengths $\lambda_1$, $\lambda_2$, $\lambda_3$ and $\lambda_4$ and reflect the other wavelengths. The first optical filter 430-1 is disposed between the I/O micro-collimator 100P and the first micro-collimator 100-1 and defines a second axis along which is disposed the second optical filter 100-2 and the second micro-collimator 100-2. The second optical filter 430-2 defines a third axis along which is disposed the third optical filter 100-3 and the third micro-collimator 100-2. The third optical filter 430-3 defines a fourth axis along which is disposed the fourth optical filter 100-4 and the fourth micro-collimator 100-4.

The dimensions WX, WY and DB of the glass tubes 10 of the micro-collimators 100 determine the position of each wavelength channel on the support substrate 410.

The precision fabrication of the glass tubes 10 for the micro-optical systems 100 provides several advantages when fabricating optical assemblies such as the WDM micro-optical assembly described herein. For example, the distance DF can be selected to define a precise height and in-plane positioning of the optical axis OA and of the Gaussian optical beam 202GB associated with the given micro-collimator 100.

The precision fabrication of the glass tube 10 and the upper surface 412 of the support substrate 410 can also allow for the given micro-optical assembly 400 to meet the designed performance requirements with perhaps only minor alignment adjustments or even without any alignment adjustments. This is particularly useful for automated assembly when micro-optical assembly 400 has small pitch and beam angle requirements for the micro-collimators 100. The accuracy of beam control in the common or channel port reduces the material variation risk in computer-aided optical assembly.

The transparent nature of the glass tube 10 facilitates machine-vision-based assembly of the micro-optical assembly 400, e.g., by being able to viewing one or more reference features 416 (e.g., alignment fiducials) on the substrate 410 through the glass tube. The transparent nature of the glass tube 10 also allows for visual inspection of the optical elements 110 and support/positioning elements 120 supported within the bore 16 of the glass tube for reliability (e.g., inspecting the adhesive 320 or securing features 340) or to control the gap distance DG between adjacent optical elements or the support/positioning elements 120 by direct observation of the gap G during assembly.

Figure 10A:
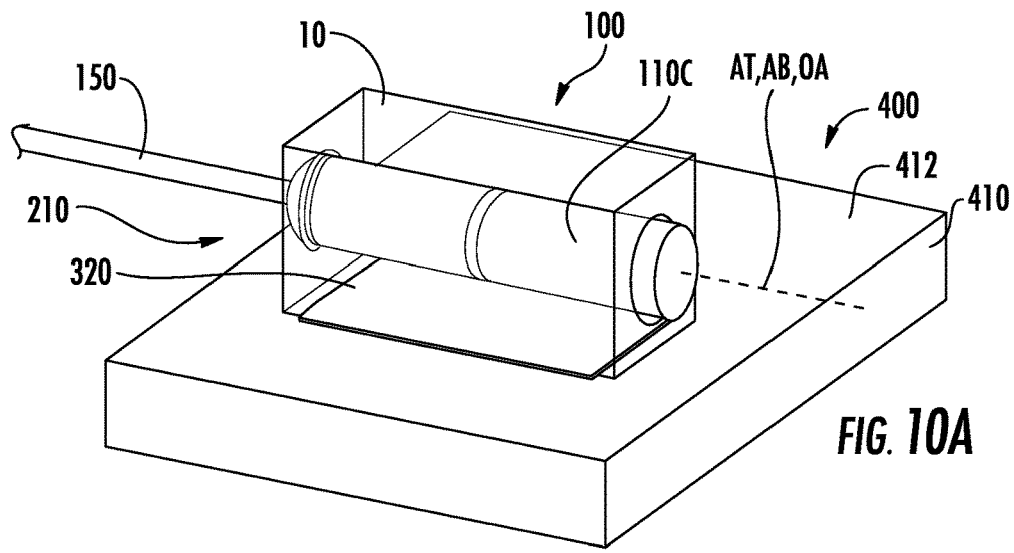
FIGS. 10A through 10C are top elevated views of an example collimator micro-optical system attached to a support substrate using an adhesive (FIG. 10A), by soldering (FIG. 10B), and by laser welding (FIG. 10C)
Figure 10B:
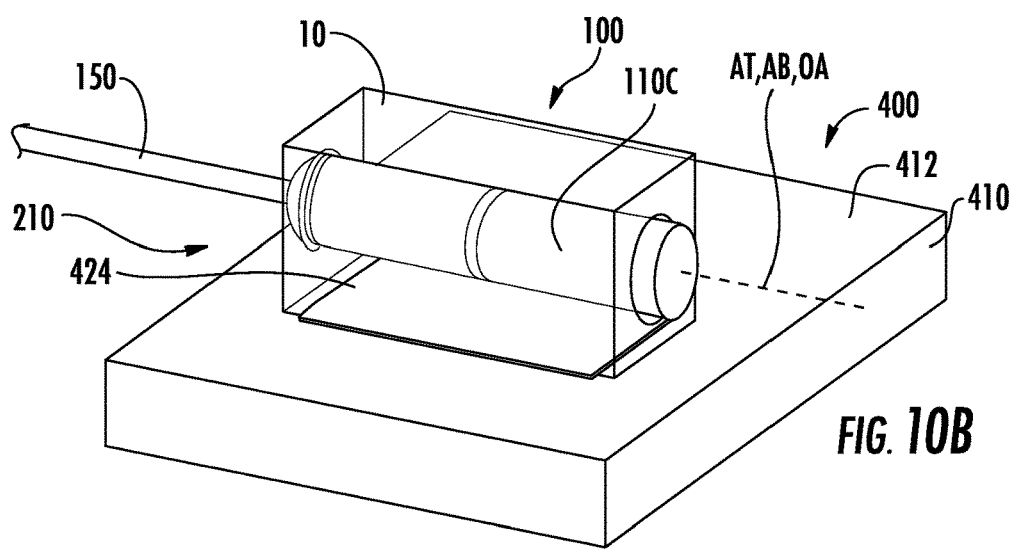
Figure 10C:
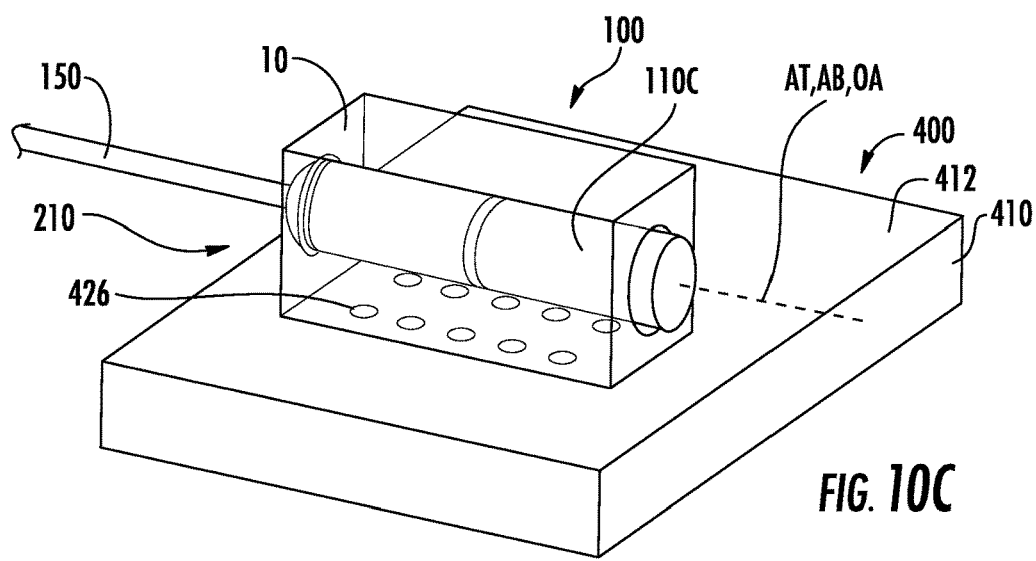

In an example, the micro-collimators 100 and optical filters 430 can be secured to the upper surface 412 of the glass support substrate 410 using an adhesive 320, glass soldering 424 or glass welding 426 using a laser, as illustrated in top elevated views of the micro-collimator 100 of FIGS. 10A through 10C, respectively. A combination of these different securing techniques can also be employed. In an example, no adhesive is used in securing the micro-optical systems 100 and optical filters 430 to the upper surface 412 of the support substrate 410. A no-adhesive embodiment of the micro-optical assembly 400 may be preferred in cases where uncertainty in the reliability of the adhesive is a concern.

With reference again to FIG. 9, in the DeMux operation, the multi-wavelength light 422 exits the I/O micro-collimator 100P that defines the I/O port and travels towards the first optical filter 430-1. The first optical filter 430-1 transmits the wavelength $\lambda_1$ to the first micro-collimator 100-1 along the first axis A1 and reflects the remaining wavelengths $\lambda_2$, $\lambda_3$ and $\lambda_4$ of multi-wavelength light beam 422 along the second axis A2. This reflected light beam is then incident upon the second optical filter 430-2, which transmits the wavelength $\lambda_2$ to the second micro-collimator 100-1 and reflects the remaining wavelengths $\lambda_3$ and $\lambda_4$ of multi-wavelength light beam 422 along the third axis A3. This process is repeated for the remaining two optical filters 430-3 and 430-4 and micro-collimators 100-3 and 100-4 along the third and fourth axes A3 and A4 so that the wavelength components $\lambda_1$, $\lambda_2$, $\lambda_3$ and $\lambda_4$ of the multi-wavelength light beam 422 are distributed to their respective micro-optical systems 100-1 through 100-4. In the Mux operation, the direction of the light 422 is reversed and the individual wavelengths $\lambda_1$, $\lambda_2$, $\lambda_3$ and $\lambda_4$ from the individual micro-collimators 100-1, 100-2, 100-3 and 100-4 are recombined by the optical filters 430-1, 430-2, 430-3 and 430-4 into I/O micro-collimator 100-P.

Figure 11:
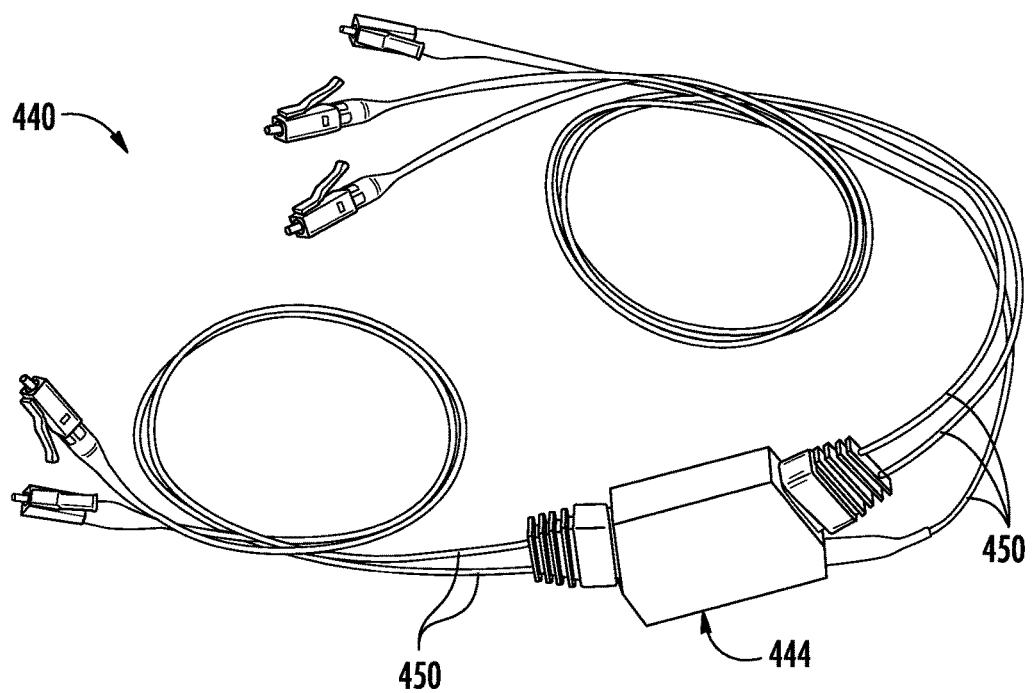
FIG. 11 is an elevated view of a WDM fiber system that includes the WDM micro-optical assembly of FIG. 9.

FIG. 11 is an elevated view of an example WDM fiber system 440 that includes the WDM micro-optical assembly 400 in the form of a module 444 and that shows five connectorized optical fibers 450 respectively optically connected to the optical fibers 150 of the five micro-collimators 100P and 100-1 through 100-4.

Laser-Induced Bump Formation on the Support Substrate

In an example where the support substrate 410 is made of glass, one or more glass bumps 120B can also be formed in the glass support substrate to adjust the position of one or more of the micro-optical systems 100 supported thereon. In an example, the support substrate 410 can be made of an IR-absorbing glass that supports glass bump formation when irradiated at IR wavelengths while the glass tube 10 and optical elements 110 and/or the supported therein (e.g., collimating lens 110C and ferrule 140) can be made from non-IR-absorbing glass. This allows for the IR-wavelength laser beam 302 to be directed through the glass tube 10 and optical elements 110 supported therein to the support substrate 410.

In another example, the optical elements 110, any support/positioning elements 120 and the glass tube 10 can be made of IR-absorbing glass while the support substrate 410 can be made of a non-IR-absorbing glass. In yet another example, the support substrate 410 and the glass tube 10 and the optical components 110 and any support/positioning elements 120 supported therein are made from IR-absorbing glass so that glass bumps can be formed in each of these components/elements.

In forming the WDM micro-optical assembly 400, the micro-optical system 100 can be rigidly held in a micropositioner and moved to its target location above the glass support substrate 410 based on surface position measurements or active optical measurements. The micro-optical system 100 can then be lowered onto three or more existing laser bumps 120B or the laser bumps can be formed while the micro-optical system 100 resides in place above the upper surface 412 of the support substrate 410. If the laser growth process results in a bump 120B with an excessively high bump height HB, a downward force can be applied on the problematic bump during subsequent irradiation with laser beam 302 to reduce the bump height HB to its target value. The downward force can be achieved simply by pressing the micro-optical system 100 onto the problematic glass bump 120B. A subsequent laser pulse 302P of lower energy can also be used to lower the height of the bump.

Figure 12A:
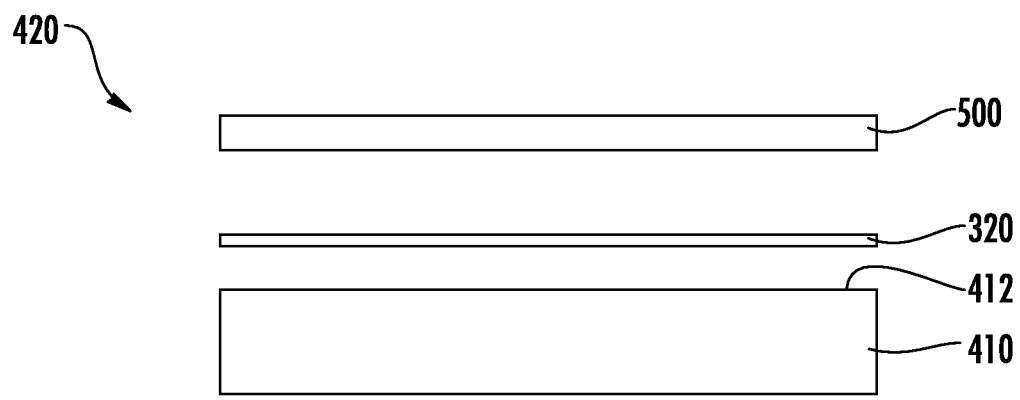
FIG. 12A is an exploded view of an example structure for a glass support substrate amenable for forming glass blisters, wherein a thin layer of an IR-absorbing glass is secured to the upper surface of the support substrate using an adhesive.

As noted above, the bump height HB of a glass bump 120B can be limited by the volume of heated glass below the bump. For example, in certain Fe-based IR absorbing glasses, the maximum bump height BH is limited to a range of between 10 to 20% of the total glass thickness. To overcome this limitation and form higher glass bumps 120B, an alternative configuration can be employed as shown in the exploded side view of FIG. 12A, where a thin layer (e.g., 100 microns) of an IR-absorbing glass 500 is secured to the upper surface 412 of the support substrate 410, which is made of nominally non-IR-absorbing glass that is thicker (e.g., 200 microns). This can be accomplished using an adhesive 320. The resulting structure defines a substrate assembly 420.

Figure 12B:
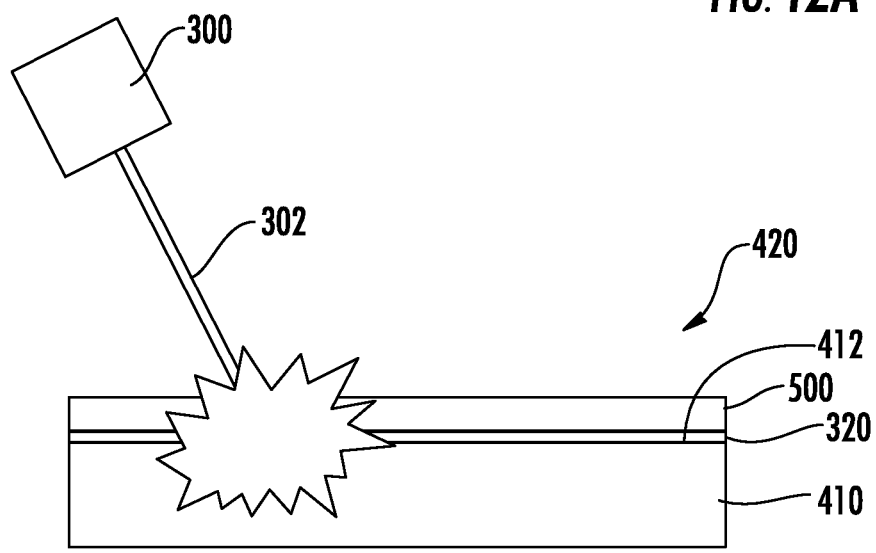
FIG. 12B shows the layered structure for the glass support substrate as shown in FIG. 12A as it is being irradiated by a laser beam.

With reference now to FIG. 12B, the substrate assembly 420 is locally irradiated with the laser beam 302 having an IR wavelength and a focus spot. In an example, the laser beam 302 is a Gaussian beam that is 200 microns in diameter and generated by a 40 W quasi-continuous wave (QCW) 1550 nm Erbium fiber laser via 20 cm focal length focusing optics. The energy is absorbed in the top IR-absorbing glass layer 500 and heats it to above its softening point (e.g., >750° C.). This glass heating also causes the adhesive 320 directly below the IR-absorbing glass layer 500 to vaporize, creating gas pressure that pushes the softened IR absorbing glass upward to form the bump 120B. In this embodiment, the bump 120B is formed as a blister rather than being made of solid glass.

Figure 12C:
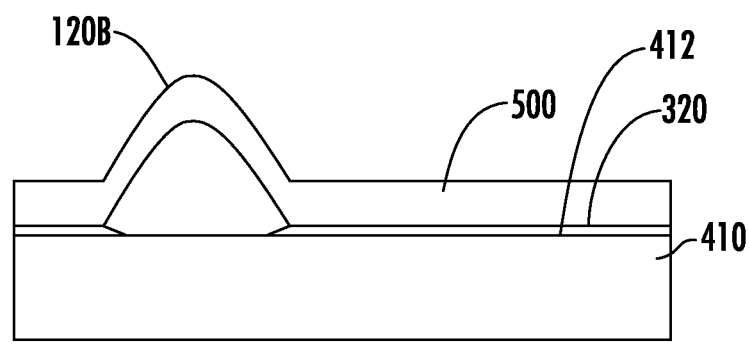
FIG. 12C shows the formation of a glass blister caused by the localized irradiation of the layered support substrate.

When the laser illumination terminates, the IR-absorbing glass layer 500 cools rapidly so that the bump 120B retains its profile, as shown in FIG. 12C. By controlling the length of the laser pulses, it is possible to create large bumps 120B that are 50% to 150% of the thickness of the IR-absorbing glass substrate 500. The shape of the bump 120B is convex and so has high strength under downward loading. Using this approach, the resulting bump 120B can expand to fill a relatively large gap and provide a rigid support when laser irradiation by laser beam 302 is terminated.

Laser-Induced Bump Formation on the Flat Side of the Glass Tube

Figure 13A:
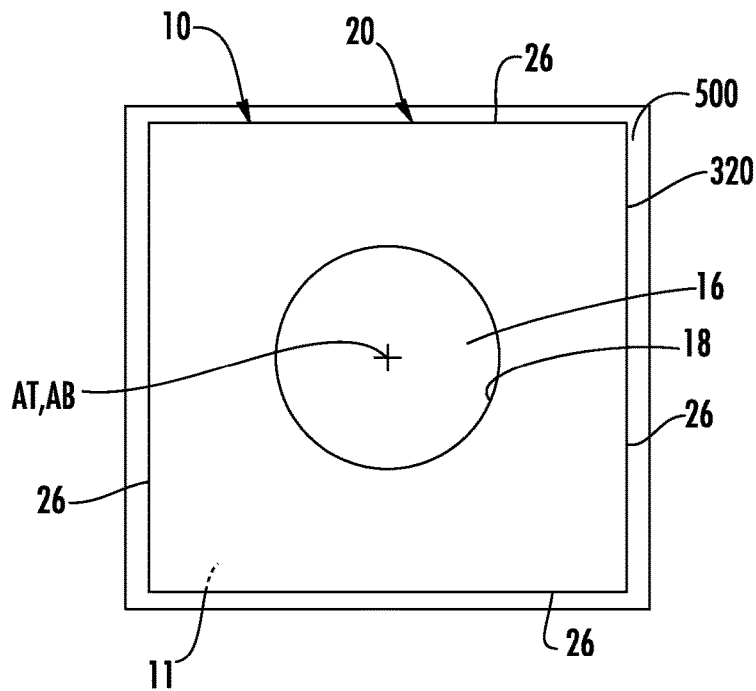
FIGS. 13A through 13C are front-on views of an example glass tube illustrating the formation of laser-induced bumps in the form of blisters on the side of the glass tube.
Figure 13B:
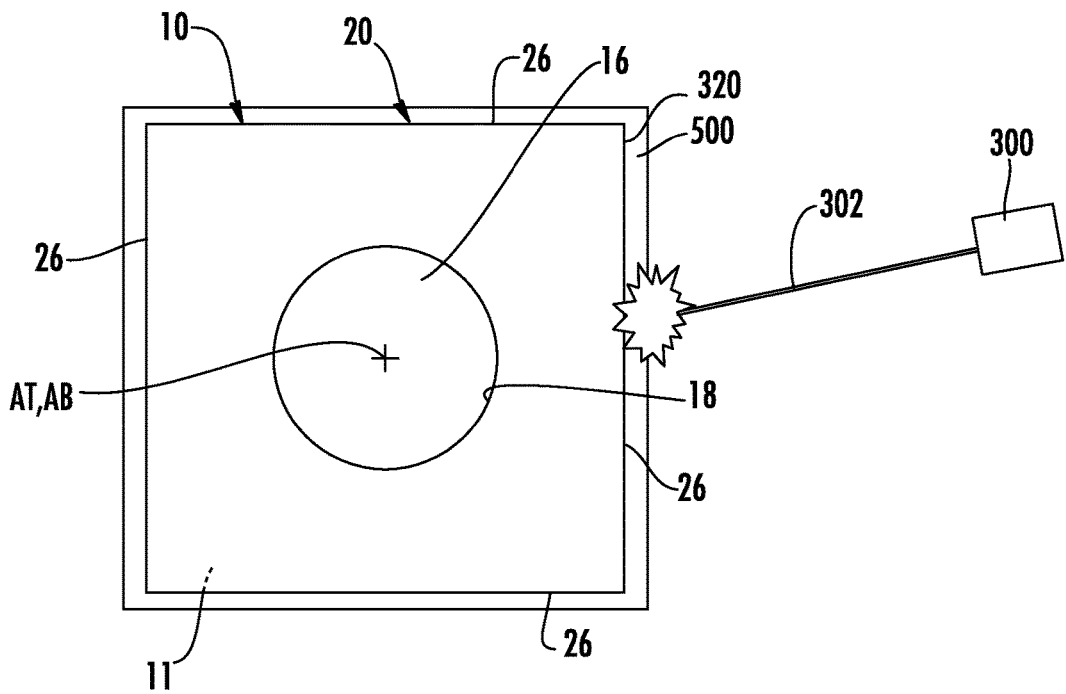
Figure 13C:
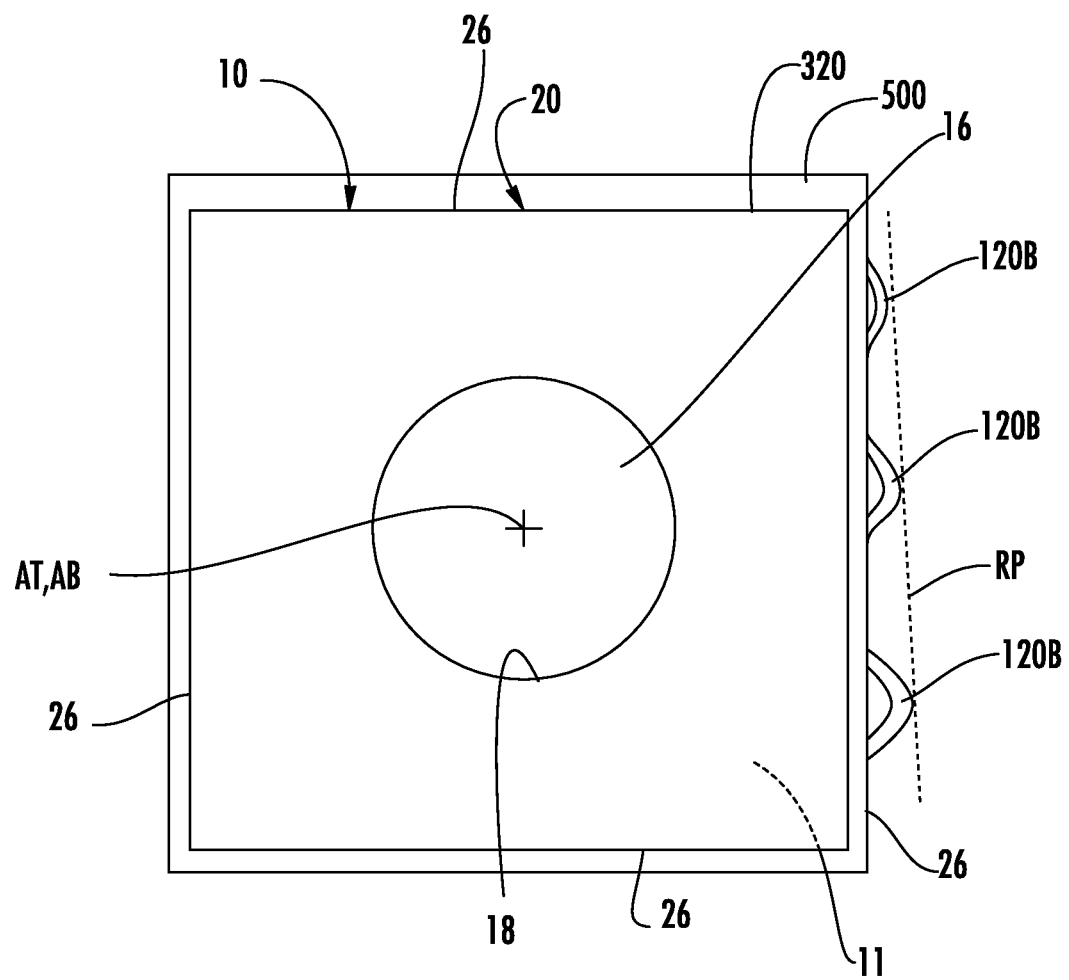

FIGS. 13A through 13C are front-on views of glass tube 10 illustrating the formation of laser-induced bumps 120B on the glass tube 10. A thin IR-absorbing layer 500 is applied to one or more of the flat sides 26 of the glass tube 10. The thin IR-absorbing layer 500 is then illuminated the laser beam 302 having an IR wavelength to form three or more bumps 120B that together establish a reference plane RP at a precise lateral offset from either the tube central axis AT or the bore central axis AB of the glass tube. In an example, an adhesive layer 320 resides between the flat surface 26 and the IR-absorbing layer 500 so that the three or more bumps 120B are blister-type bumps.

The substrate assembly 420 can be employed in forming a micro-optical assembly 400 when it is desirable to employ relatively large bumps 120B for component alignment. As described above, the bumps 120B can be formed beneath glass optical components or component carriers to provide precision optical alignment. The bumps 120B can be used as precision mechanical stops for optical components or component carriers that are mounted on substrate assembly 420. For example, two laser bumps 120B can serve as a side or end stop to limit travel of optical components while orienting them parallel to an optical datum. A third laser bump 120B can limit travel in the orthogonal direction, forming a corner pocket into that rectangular optical component carriers can be forced into during assembly. The optical component carrier can include a precision diameter hole or pit in its base. This hole can be positioned over a single laser bump 120B so that the laser bump becomes a pivot point for angular adjustment of the optical component. Ridges, walls, and other linear structures can be formed by translating the support substrate 410 or the substrate assembly 420 during laser exposure. Corner pockets can be formed using this technique, along with enclosed regions that can be used to limit the lateral flow of adhesive during component attachment.

Form Factor Advantage

The micro-optical systems 100 disclosed herein have an advantage when forming micro-optical assemblies 400 that require a small form factor associated with a high degree of integration.

Figure 14A:
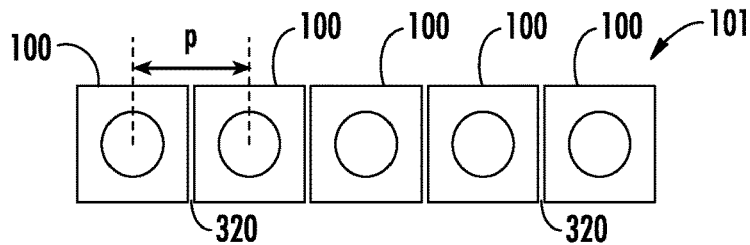
FIG. 14A is a front-on view of an array of five micro-optical systems as disclosed herein.
Figure 14B:
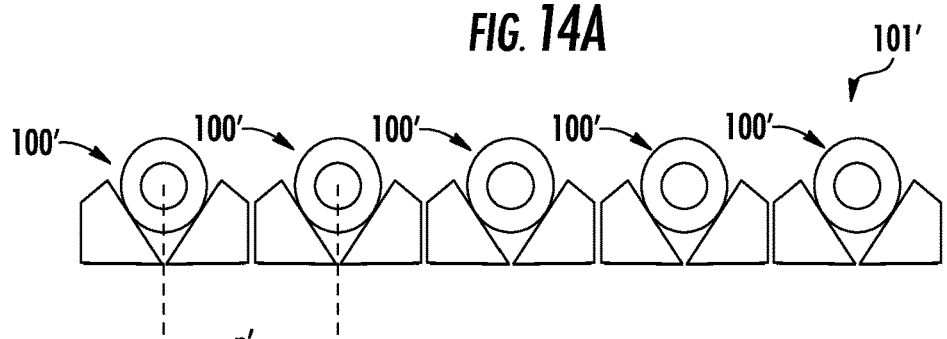
FIG. 14B is a front-on view of an array of five micro-optical systems that require substantially more space than the micro-optical systems of FIG. 14A.

FIG. 14A is a front-on view of an array 101 of five micro-optical systems 100. The array 101 has a pitch p in the x-direction of p=WX, which in example is about 2 mm. FIG. 14B is a front-on view of an array 101' of five conventional micro-optical systems 100' that utilize a steel tube 10' rather than a glass tube 10 and that include a V-groove support base 103' to support the steel tube. Each steel tube 10' is positioned with V-groove support base 103' and can move therein, making it difficult to achieve and then maintain align for small pointing angles. The array 101' has a pitch p'.

Figure 14C:
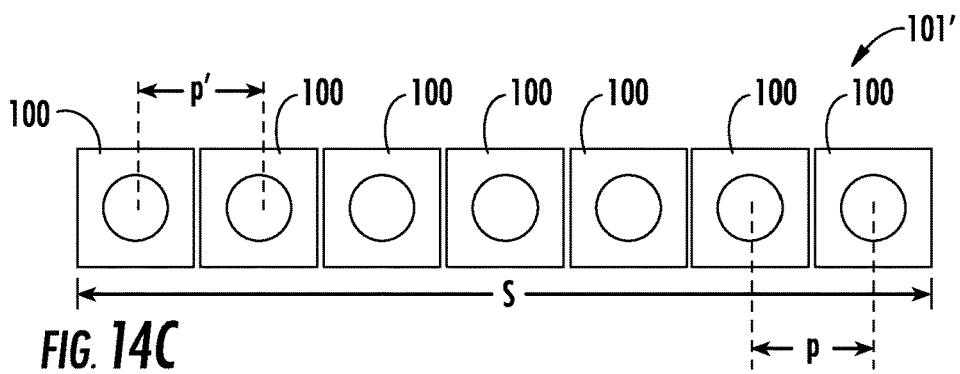
FIGS. 14C and 14D are similar to FIGS. 14A and 14B respectively, except that seven micro-optical systems are shown in FIG. 14C while in FIG. 14D only three micro-optical systems can occupy the same amount of space.
Figure 14D:
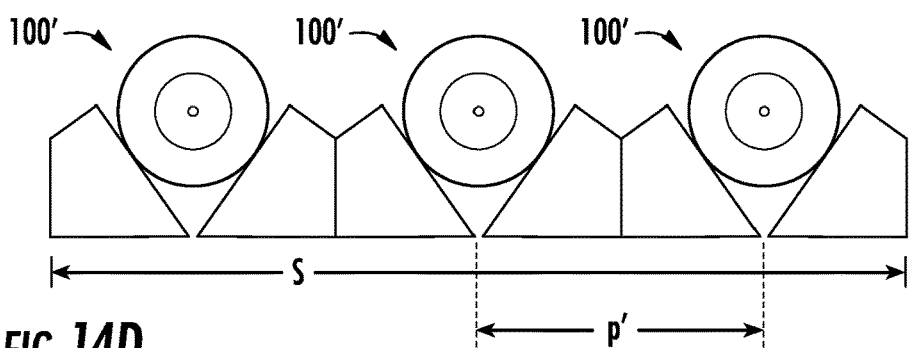

FIGS. 14C and 14D are similar to FIGS. 14A and 14B respectively, except that seven micro-optical systems 100 are shown in FIG. 14C while three prior-art micro-optical systems 100' are shown occupying the same amount of space S.

The corresponding pitch p' of array 101' is about 4.67 mm. Thus, the pitch p of array 101 is about 2.4× smaller that the pitch p' of the corresponding prior art array. The actual size difference for an array of five micro-optical systems is 5×2.67 mm=13.35 mm. A reduction in the wall thickness TH of glass tube 10 can make this difference even larger, e.g., closer to 15 mm or even 17 mm. This results in a substantial space savings that an enables a smaller form factor for optical assemblies 400 formed using micro-optical systems 100. For example, as shown in FIGS. 14C and 14D, in the amount of space required to support three prior-art micro-optical systems 100' (FIG. 14D) can store seven of the micro-optical systems 100 as disclosed herein (FIG. 14C). The ability to form compact arrays 101 of micro-collimators 100 for example is an important feature of the micro-optical systems disclosed herein, considering that some complex WDM micro-optical assemblies can have tens or even hundreds of channels.

The one or more flat sides 26 of glass tubes 10 also provide an advantage in configuring the array 101 of micro-optical systems 100 by being able to place sides of adjacent micro-optical systems in close proximity to one another and secure them to each other as well as to the upper surface 412 of the support substrate. Once a first micro-optical system 100 is properly aligned on the support substrate (e.g., relative to a reference or alignment feature thereon), then the other micro-optical systems can be added immediately adjacent the first aligned micro-optical system and be automatically aligned within the micro-optical assembly 400. This results in fewer process steps for aligning the entire micro-optical assembly 400.

After alignment, the array 101 of micro-optical systems 100 can be held together by an adhesive 320 (e.g., a UV curable adhesive) that wicks into that gaps between adjacent glass tubes 10. In an example, the adhesive 320 can then be activated by UV light. The micro-optical systems 100 can also be formed as a stand-alone array 101 and then attached to the upper surface 412 of the support substrate 410. The micro-optical systems 100 that make up the array 101 can also be secured to one another using at least one of the laser welding process and the glass soldering process as described above to form an adhesive-free micro-optical assembly 400.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A micro-optical system, comprising:
a glass tube having a body, a front end, a back end, an outer surface between the front end and the back end, and a bore that runs through the body between the front end and the back end, wherein the bore is defined by an inner surface of the glass tube, wherein the glass tube has a tube central axis, wherein the outer surface includes at least one flat side extending from the front end to the back end for mounting the glass tube on a substrate and the at least one flat side has a maximum width in the range from 0.1 mm to 20 mm;
an optical element in the bore, wherein the optical element is sized to be movable within the bore to a select location within the bore;
a ferrule in the bore, wherein the ferrule is sized to be movable within the bore to support the optical element at the select location;
a positioning element formed along the inner surface of the glass tube, the positioning element is sized to form a mechanical stop within the bore to engage the optical element and the ferrule to form an axial gap therebetween and restrict axial movement of the optical element at the select location; and
a securing feature for securing the optical element at the select location.

2. The micro-optical system according to claim 1, wherein the positioning element comprises a glass bump, wherein the glass bump defines either the mechanical stop or an alignment feature for the optical element.

3. The micro-optical system according to claim 1, wherein the outer surface defines a square cross-sectional shape having four flat sides, and wherein the maximum width is in the range from 1.5 mm to 5 mm.

4. The micro-optical system according to claim 1, wherein the glass tube has a length that runs between the front end and the back end, and wherein the length is in the range from 5 mm to 10 mm.

5. The micro-optical system according to claim 1, wherein the optical element comprises a collimating lens arranged within the bore and an optical fiber pigtail arranged partially within the bore, and wherein the collimating lens and optical fiber pigtail are axially spaced apart within the bore by an axial gap distance.

6. The micro-optical system according to claim 5, wherein the collimating lens consists of a single lens element.

7. The micro-optical system according to claim 6, wherein the single lens element is in the form of a gradient-index lens element.

8. The micro-optical system according to claim 5, wherein the positioning element comprises first and second glass bumps that respectively define mechanical stops for the collimating lens.

9. The micro-optical system according to claim 1, wherein the at least one flat side comprises four flat sides.

10. The micro-optical system according to claim 1, wherein the securing feature comprises an adhesive.

11. The micro-optical system according to claim 10, wherein the adhesive is an ultraviolet-activated adhesive.

12. The micro-optical system according to claim 1, wherein the securing feature includes one or more glass solder points, one or more glass weld points, or a combination of one or more glass solder points and one or more glass weld points.

13. The micro-optical system according to claim 1, wherein the micro-optical system does not contain an adhesive material.

14. The micro-optical system according to claim 1, wherein the glass tube is cylindrical.

15. The micro-optical system according to claim 1, further comprising a layer of infra-red absorbing glass on the outer surface of the glass tube.

16. A micro-optical system, comprising:
a glass tube having a body, a front end, a back end, an outer surface, and a bore that runs through the body between the front end and the back end, wherein the bore is defined by an inner surface of the glass tube, wherein the glass tube has a tube central axis, wherein the outer surface includes at least one flat side for mounting the glass tube on a substrate and the at least one flat side has a maximum width in the range from 0.1 mm to 10 mm, and wherein the body has a length extending between the front end and the back end, wherein the length is between 5 mm and 20 mm;
a collimating lens arranged in the bore adjacent the front end of the glass tube;
an optical fiber pigtail arranged partially within the bore adjacent the back end of the glass tube, wherein the collimating lens and optical fiber pigtail are axially spaced apart by an axial gap distance; and
a positioning element formed along the inner surface of the glass tube, wherein the positioning element forms a mechanical stop within the bore to engage the collimating lens and the optical fiber pigtail to thereby form an axial gap therebetween.

17. The micro-optical system according to claim 16, wherein the positioning element comprises first and second glass bumps that respectively define mechanical stops for the collimating lens.

18. The micro-optical system according to claim 16, wherein the collimating lens and the optical fiber pigtail are each secured within the bore using either solder points or glass weld points.

19. The micro-optical system according to claim 1, wherein:
the positioning element comprises a first glass bump and a second glass bump;
the first glass bump is positioned within the bore at the select location such that the first glass bump engages the optical element within the bore;
the second glass bump is positioned within the bore and engages the ferrule within the bore; and
the axial gap formed between the optical element and the ferrule is defined by the first and second glass bumps.

20. The micro-optical system according to claim 16, wherein:
the positioning element comprises a first glass bump and a second glass bump;
the first glass bump is positioned within the bore adjacent the front end and engages the collimator lens;
the second glass bump is positioned within the bore adjacent the back end and engages the optical fiber pigtail; and
the axial gap formed between the collimator lens and the optical fiber pigtail is defined by first and second glass bumps.

* * * * *